(12) United States Patent
Jacoby et al.

(10) Patent No.: US 9,635,401 B2
(45) Date of Patent: Apr. 25, 2017

(54) RECOMMENDATION OF TELEVISION CONTENT

(71) Applicant: Yahoo! Inc., Sunnyvale, CA (US)

(72) Inventors: Ronald Jacoby, Saratoga, CA (US); Scott Lincke, San Carlos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 14/069,275

(22) Filed: Oct. 31, 2013

(65) Prior Publication Data
US 2015/0121408 A1 Apr. 30, 2015

(51) Int. Cl.
| | |
|---|---|
| G06F 3/00 | (2006.01) |
| G06F 13/00 | (2006.01) |
| H04N 5/445 | (2011.01) |
| H04N 21/25 | (2011.01) |
| H04N 21/482 | (2011.01) |
| H04N 21/258 | (2011.01) |
| H04N 21/2668 | (2011.01) |
| H04N 21/439 | (2011.01) |
| H04N 21/44 | (2011.01) |
| H04N 21/442 | (2011.01) |
| H04N 21/45 | (2011.01) |
| H04N 21/658 | (2011.01) |

(52) U.S. Cl.
CPC .......... *H04N 21/251* (2013.01); *H04N 21/25* (2013.01); *H04N 21/25891* (2013.01); *H04N 21/2668* (2013.01); *H04N 21/4394* (2013.01); *H04N 21/44008* (2013.01); *H04N 21/44222* (2013.01); *H04N 21/45* (2013.01); *H04N 21/4532* (2013.01); *H04N 21/4826* (2013.01); *H04N 21/6582* (2013.01)

(58) Field of Classification Search
CPC ...... H04N 21/25; H04N 21/251; H04N 21/45; H04N 21/466; H04N 21/4668; H04N 21/4826
USPC .......................................... 725/9, 37–40, 46
See application file for complete search history.

(56) References Cited

U.S. PATENT DOCUMENTS

| | | | |
|---|---|---|---|
| 2004/0230994 A1* | 11/2004 | Urdang et al. | 725/88 |
| 2007/0219856 A1* | 9/2007 | Ahmad-Taylor | 705/14 |
| 2009/0030792 A1* | 1/2009 | Khivesara et al. | 705/14 |
| 2010/0088312 A1* | 4/2010 | Goldfeder | 707/732 |
| 2010/0186041 A1* | 7/2010 | Chu et al. | 725/46 |
| 2010/0192180 A1* | 7/2010 | Olague | H04N 21/4126 725/42 |
| 2010/0306805 A1* | 12/2010 | Neumeier et al. | 725/60 |
| 2012/0204201 A1* | 8/2012 | Cassidy et al. | 725/10 |
| 2013/0332962 A1* | 12/2013 | Moritz et al. | 725/46 |

* cited by examiner

*Primary Examiner* — Jeremy Duffield
(74) *Attorney, Agent, or Firm* — Martine Penilla Group, L.L.P.

(57) ABSTRACT

A method for recommending television content is provided, including the following operations: identifying available television channels for a television device; determining a current date and time; identifying a plurality of content items broadcast on the available television channels at approximately the current date and time; determining a device profile associated with the television device, the device profile being time-dependent; determining recommended content items from the plurality of content items based on the device profile of the television device.

15 Claims, 17 Drawing Sheets

Program/Genre-Specific Relevance Threshold for
Linear TV Program

RECOMMENDATION OF TELEVISION CONTENT

CLAIM OF PRIORITY

The present application claims priority to U.S. application Ser. No. 13/075,149, filed Mar. 29, 2011, entitled "METHODS AND SYSTEMS FOR APPLICATION RENDERING AN MANAGEMENT ON INTERNET TELEVISION ENABLED DISPLAYS," which claims priority to U.S. Provisional Patent Application No. 61/320,685, filed Apr. 2, 2010, entitled "METHODS AND SYSTEMS FOR DISPLAY DEVICE WIDGET ACCESS AND MANAGEMENT." The present application also claims priority to U.S. application Ser. No. 12/982,811, filed Dec. 30, 2010, entitled "ENTERTAINMENT COMPANION CONTENT APPLICATION FOR INTERACTING WITH TELEVISION CONTENT," and to U.S. application Ser. No. 13/220,654, filed Aug. 29, 2011, entitled "ENTERTAINMENT CONTENT RENDERING APPLICATION," and to U.S. application Ser. No. 12/977,643, filed Dec. 23, 2010, entitled "SIGNAL-DRIVEN INTERACTIVE TELEVISION." The disclosures of these applications are herein incorporated by reference in their entirety for all purposes.

RELATED APPLICATIONS

The present application is related to U.S. application Ser. No. 14/069,277, filed the same day as the present application, entitled "CROSS-PLATFORM INTERFACE FOR A TELEVISION DEVICE," which is herein incorporated by reference in its entirety for all purposes.

BACKGROUND

1. Field of the Invention

The present invention relates to methods and systems for recommending television content.

2. Description of the Related Art

In recent years, the range of content that can be viewed on television devices has greatly expanded. For example, linear television programming can be available through an over-the-air (OTA) antenna signal, direct cable signal, a cable/satellite box or other set top box, or other device. Users also have access to various sources of on-demand video content. For example, a signal carrier may make on-demand content available through a set top box. Other on-demand providers may make their on-demand content available through an application which executes on the television itself or on another device that is connected to the television, such as a game console or other computing device supporting its application. Such applications may communicate over the Internet to send and receive data. Additionally, televisions and their associated devices may be configured to access web content over the Internet, which can include web videos, web pages, etc. However, the increasing diversity and quantity of content available for viewing on a television makes it more difficult for a user to decide what to watch at any given moment.

It is in this context that embodiments of the invention arise.

SUMMARY

Broadly speaking, embodiments of the present invention provide methods and systems for recommending television content. Several inventive embodiments of the present invention are described below.

In one embodiment, a system is provided, comprising: a television, including a receiver capable of receiving a plurality of channels, each channel providing a plurality of television content items; a non-transitory memory connected to the television, including: a device profile associated with the television; and program logic, including a clock supplying a date and time; a recommendation engine that receives the date and time and the device profile and generates in response a recommendation of at least one television content item.

In one embodiment, the device profile defines a schedule of content preferences; the recommendation engine determines current content preferences as defined by the schedule of content preferences for the date and time, and identifies ones of the plurality of television content items matching the current content preferences.

In one embodiment, the schedule of content preferences defines a cyclical timeline of preference values for each of a plurality of content categories.

In one embodiment, the device profile defines an association between a preferred content category and both a day of the week and a time of day.

In one embodiment, the recommendation engine identifies an elapsed amount of each of the plurality of content items that is already in progress, and determines whether the elapsed amount exceeds a predefined relevance threshold.

In one embodiment, the recommendation engine identifies an elapsed amount of each of the plurality of content items that is already in progress, and determines a relevance factor based on the elapsed amount.

In one embodiment, the non-transitory memory further includes a user profile associated to the user of the television device; wherein the recommendation engine receives the user profile and generates the recommendation in response.

In one embodiment, the user profile is defined based on internet activity associated with the user.

In one embodiment, the program logic further includes a device profile generator that receives samples of content rendered on the television device, analyzes the samples to identify watched content items associated with the television device, and generates the device profile based on the watched content items.

In one embodiment, the samples are defined by audio portions from the content rendered on the television device; wherein the device profile generator analyzes the audio portions to identify the watched content items associated with the television device.

In one embodiment, the device profile identifies the plurality of channels.

In one embodiment, the recommendation engine transmits the recommendation of at least one television content item to an application configured for execution on the television device, the application being unaffiliated with a service provider that provides the television channels to the television device.

In another embodiment, a method for recommending television content is provided, comprising: identifying available television channels for a television device; determining a current date and time; identifying a plurality of content items broadcast on the available television channels at approximately the current date and time; determining a device profile associated with the television device, the device profile being time-dependent; determining recommended content items from the plurality of content items based on the device profile of the television device; wherein the method is executed by at least one processor.

In one embodiment, the device profile defines a schedule of content preferences; determining recommended content items includes determining current content preferences as defined by the schedule of content preferences for the current date and time, and identifying ones of the plurality of content items matching the current content preferences.

In one embodiment, the schedule of content preferences defines a cyclical timeline of preference values for each of a plurality of content categories.

In one embodiment, the device profile defines an association between a preferred content category and both a day of the week and a time of day.

In one embodiment, determining recommended content items includes identifying an elapsed amount of each of the plurality of content items that is already in progress, and determining whether the elapsed amount exceeds a predefined relevance threshold.

In one embodiment, determining recommended content items includes identifying an elapsed amount of each of the plurality of content items that is already in progress, and determining a relevance factor based on the elapsed amount.

In one embodiment, the method further comprises: identifying a user of the television device; retrieving a user profile associated to the user of the television device; wherein determining recommended content items is based on the user profile.

In one embodiment, the user profile is defined based on internet activity associated with the user.

In one embodiment, the method further comprises: receiving samples of content rendered on the television device; analyzing the samples to identify watched content items associated with the television device; generating the device profile based on the watched content items.

In one embodiment, the samples are defined by audio portions from the content rendered on the television device; wherein analyzing the samples includes analyzing the audio portions to identify the watched content items associated with the television device.

In one embodiment, the method further comprises: determining the available television channels based on the watched content items.

In one embodiment, the recommendations are provided to an application configured for execution on the television device, the application being unaffiliated with a service provider that provides the television channels to the television device.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

Figure 1:
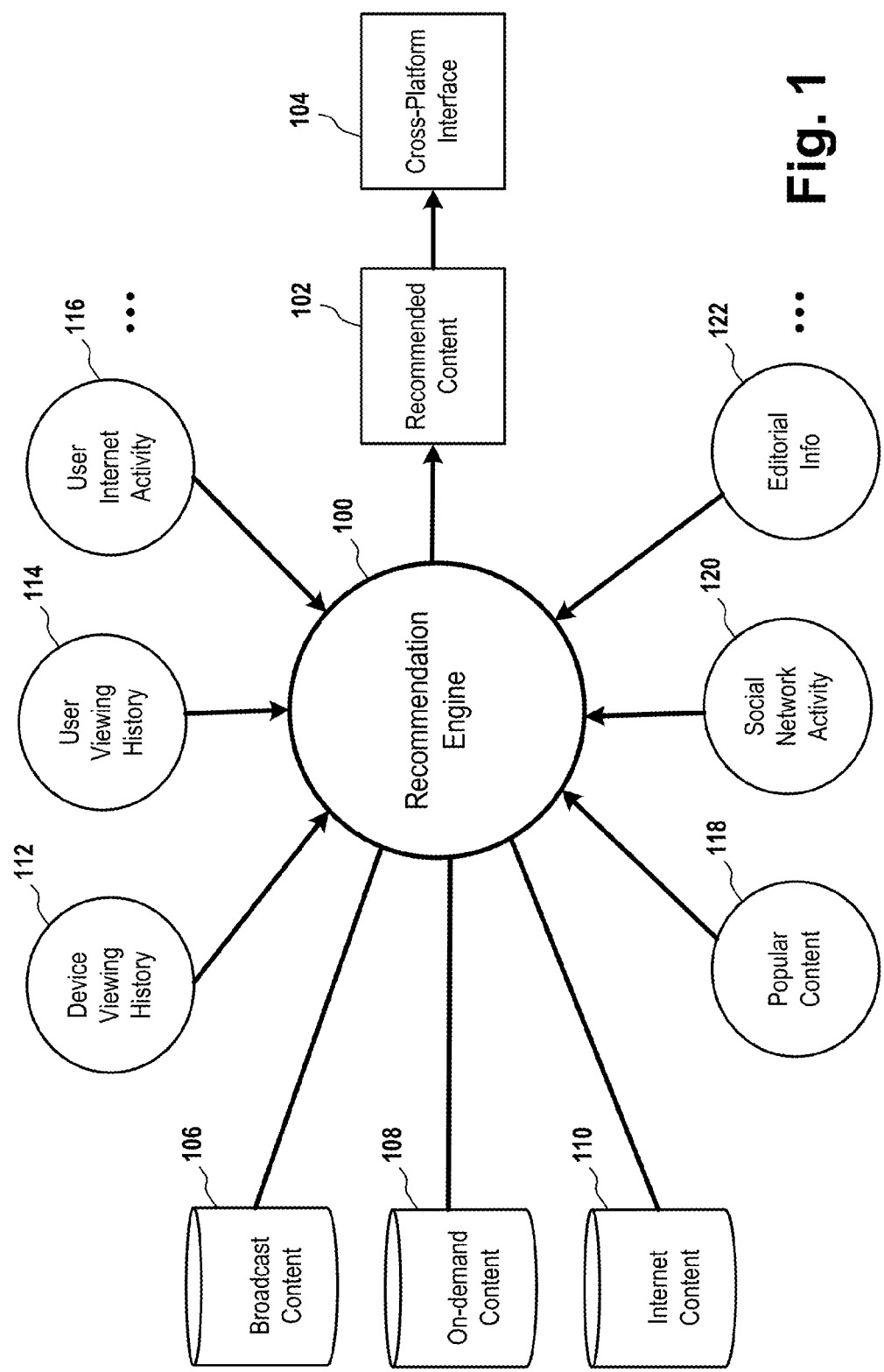
FIG. 1 conceptually illustrates a recommendation engine configured to recommend content for viewing on a television device, in accordance with an embodiment of the invention.

The following embodiments describe systems and methods for recommending television content. It will be obvious, however, to one skilled in the art, that the present invention may be practiced without some or all of these specific details. In other instances, well known process operations have not been described in detail in order not to unnecessarily obscure the present invention.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Throughout the present disclosure, reference will be made to a "television" or "television device," such terms being used interchangeably. A television device shall be broadly construed to define a singular device or a combination of connected devices having at a minimum a display configured to render video content for consumption by a viewer. A television device generally includes a tuner or decoder capable of tuning or decoding television content signals in order to access programming that is transmitted over channels defined by the television content signals. While in some embodiments, the aforementioned hardware is included within the form factor of a singular device, in other embodiments such hardware may be defined by two or more devices that are connected to each other. It should be appreciated that various communication interfaces between such devices may include various digital or analog connections, including component video/audio, coaxial, USB, HDMI, Cat5/6, Toslink, XLR, RCA, BNC, etc. In some embodiments, such devices may be wirelessly connected to each other, employing any of various wireless communication technologies, such as IEEE 802.11, IR, Bluetooth, etc. A television device may additionally include memory and a processor, which may be configured to store and execute program instructions. A television device can be configured to execute one or more applications which may provide various kinds of functionality and features, as described in further detail herein.

FIG. 1 conceptually illustrates a recommendation engine configured to recommend content for viewing on a television device, in accordance with an embodiment of the invention. Broadly speaking, the recommendation engine 100 is configured to evaluate currently available content based on various factors, and generate recommendations from the available content for viewing. In the illustrated embodiment, the recommendation engine 100 determines recommended content 102 for recommendation to a user, and which may be presented through a cross-platform interface 104 to the user.

It will be appreciated that various kinds of content can be available for viewing on a television device. By way of example, broadcast content 106 can include any type of linear television content being currently broadcast for viewing. Linear television content is broadcast in a time-sensitive manner on various television channels, and will be understood to encompass both publicly available television content, such as is broadcast on over-the-air (OTA) channels, as well as content requiring paid subscription, such as that which may be broadcast on cable/satellite television channels or Internet broadcast channels.

On-demand content 108 includes various kinds of content which can be cued for viewing at will by the user at a time of their choosing. Some on-demand content may be provided by a cable/satellite provider as a part of a subscription package to their content service. On-demand content may be available for limited time periods as specified by the provider. On-demand content may also include content made available for viewing through third-party applications which may execute on a television or on a device connected to the television, such as a set top box, gaming console, blu-ray/dvd player, etc. Such on-demand content providers are typically characterized as streaming video services, of which examples include Netflix®, Hulu™, Amazon Instant Video™, and the like.

Internet content 110 includes content that is generally available over the internet, such as web videos, articles, images, and other kinds of content. Internet content is typically accessible through a web browser, which can be a standalone application or may be embedded within another application. In the context of a television viewing experience, it will be appreciated that Internet content may be presented through an application executing on the television which includes a browser functionality to access such Internet content.

The aforementioned types of content are provided by way of example only, and not by way of limitation. It will be appreciated that various other kinds or classifications of content can be available for viewing on a television device, and that such content can be evaluated in accordance with the embodiments described herein to provide recommendations to a viewer. For example, in one embodiment, locally recorded content (e.g. recorded on a DVR or set top box) may be available for viewing and may be evaluated for recommendation purposes.

As noted, the recommendation engine 100 determines recommended content 102 from the available content based on various factors. One factor is the device viewing history 112. The device viewing history 112 identifies what content has been viewed on a specific television device and what times such content was viewed. Methods and systems for identifying content that is viewed on a television are described in further detail with reference to U.S. application Ser. No. 12/977,643, filed Dec. 23, 2010, entitled "SIGNAL-DRIVEN INTERACTIVE TELEVISION," the disclosure of which is incorporated by reference herein. It should be understood that the device viewing history 112 is specific to a given television device, and such viewing history may or may not also be associated with a specific user, as the user of a television device may or may not be identified, though the content displayed on the television is identified. The device viewing history 112 can be analyzed to determine what kinds of content are available for viewing on a television device. For example, if it is determined that no content from a particular channel is displayed on the television, then it might also be inferred that the television does not have access to the particular channel. However, if a plurality of channels are known to be provided in combination with each other (e.g. via a subscription package), then device viewing history which includes content from one or more of the plurality of channels might indicate that all of the plurality of channels are available for viewing on the television device.

Another factor that can be considered by the recommendation engine 100 is the user viewing history 114, which identifies content viewed by a specific user and the times such content was viewed. The user viewing history can identify content viewed on a single television device or multiple television devices, provided the content is viewed by a specific user.

Another factor for consideration by the recommendation engine is the user internet activity 116, which identifies the browsing activity of a user on internet websites, such as the Yahoo! web portal and other Internet sites and sources. It will be appreciated that the user internet activity may encompass activity on various websites and web pages. Such internet activity can be analyzed to determine a profile of a user which may identify interests, preferences, or other information about a user based on the user's internet activity.

Another factor that may be evaluated by the recommendation engine 100 is popular content 118. Popular content 118 identifies content that has been determined to be popular based on some metric, such as ratings, viewership, likes, dislikes, thumbs up, thumbs down, comments, sharing profiles, postings to social networks, conversations with friends, and the number or quantity of such activities, and combinations of two or more thereof, etc. Popular content may also be identified according to demographic characteristics, such as geography, characteristics of the user (such as may be defined by the aforementioned user profile), etc. In addition, it is noted that real-time popular content can be identified, that is, content which is popular among viewers at the present moment in time. This can be determined based on real-time identification of content that viewers are presently watching.

Yet another factor which may be considered by the recommendation engine 100 is social network activity 120, which defines activity on a social network that is associated with a given user. Such activity can include activity by the user on the social network, as well as activity by friends or others that are connected to the user on the social network. Social network activity can include posts to the social network, comments in response to posts, identification of others that the user is following, apps installed for the user's account, pictures, videos, links, etc.

Another factor for consideration by the recommendation engine is editorial information 122, which may include information defined by editors to influence the recommendation engine's processing to identify recommended content. For example, editorial information 122 may define a featured content item that is to be recommended. This enables editors to strategically define recommended content to television viewers. In various embodiments, the featured content item might be recommended for all devices/users, or for some devices/users meeting certain predefined criteria (e.g. devices/users in a specific market/geographic location, devices/users having a certain profile, etc.). If the featured content item is a linear television program, then the content item might only be recommended if it is currently being broadcast. Of if the featured content item is an on-demand or Internet content item, then it may be recommended at any time, or during specified time periods (e.g. certain times of day).

Figure 2:
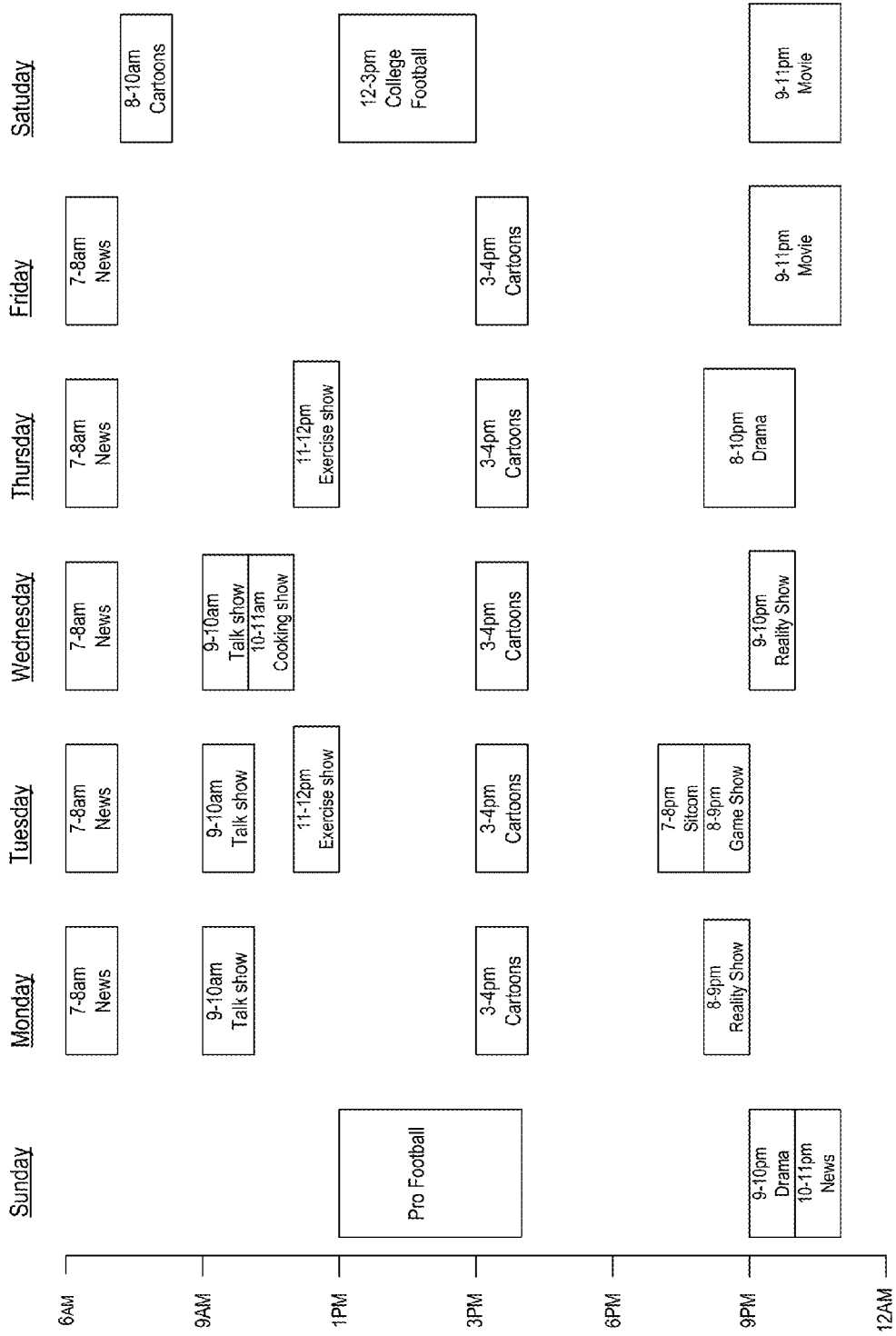
FIG. 2 illustrates a chart showing various kinds of content items viewed on a television device during an exemplary week, in accordance with an embodiment of the invention.

FIG. 2 illustrates a chart showing various kinds of content items viewed on a television device during an exemplary week (or time period), in accordance with an embodiment of the invention. The provided chart is presented for purposes of explanation and demonstration of principles in accordance with embodiments of the invention. Throughout the present disclosure, reference is made to content being watched or viewed on a television device. It will be appreciated that this is synonymous with such content being rendered, displayed, or otherwise presented on the television device. As shown with reference to FIG. 2, on Sunday, professional football is viewed on the television from 12 pm to 4 pm; a drama program is viewed from 9 pm to 10 pm; and a news program is viewed from 10 pm to 11 pm. On Monday through Friday, a news program is viewed from 7 to 8 am; and cartoons are viewed from 3 to 4 pm. On Monday, Tuesday, and Wednesday, a talk show is viewed from 9 to 10 am. One Tuesday and Thursday, from 11 am to 12 pm, an exercise program is viewed. On Monday evening, a reality show is viewed from 8 to 9 pm. On Tuesday evening, a sitcom is viewed from 7 to 8 pm, and a game show is viewed from 8 to 9 pm. On Wednesday at 10 to 11 am, a cooking show is viewed; and from 9 to 10 pm, a reality show is watched. On Thursday evening, drama programs are viewed from 8 to 10 pm. On Friday evening, a movie is watched from 9 to 11 pm. On Saturday morning from 8 to 10 am, cartoons are viewed; college football is viewed from 12 to 3 pm; and a movie is viewed from 9 to 11 pm.

The chart shown at FIG. 2 is representative of a given week of television content viewing for a specific television device. By analyzing the content presented on the television device and the times at which such content is presented, a time-dependent device profile can be determined which identifies content or types of content that are displayed on the television device and the times at which such content is likely to be viewed. Thus, the device profile may define a schedule of content preferences, so that for a given time and date, the schedule may identify a type of content or a specific content item that is likely to be preferred at that time and date. Throughout the present specification, reference will be made to "time-dependent" items or information such as a time-dependent profile or time-dependent preferences. A time-dependent item is one which defines values purely as a function of time. That is, the time-dependent item defines values for various times. This may also be characterized as a variable whose value is defined as a function of time, or is defined for each unit of time. The concept is to be distinguished from items which are simply updated over the course of time, such that the item can be said to change over time. For such updating does not define the item based on the time, but rather on conditions which happen to exist at the time the updating is performed. By contrast, a time-dependent item, as defined herein, defines a relationship between a variable and time, with the value of the variable being defined as a function time.

Thus, by way of example, with continued reference to the schedule shown at FIG. 2, it may be determined that a news program is viewed from 7 to 8 am, Monday through Friday. Therefore, the device profile associated with the television device may define a preference for a specific news program or for news programming in general during these times. Similarly, the device profile may define a preference for cartoons from 3 to 4 pm, Monday through Friday, as well as 8 to 10 am, on Saturday, as it is determined that cartoons are watched on the television during these times. For Friday and Saturday evenings, the device profile may define a preference for movies, as movies tend to be watched on the television device during these times. As can be seen, the device profile is time-dependent, and not only identifies content or content types which are preferred, but also when such content is preferred for viewing on a specific television device for which the device profile is defined. Based on such a device profile, a recommendation engine may recommend content at a current time and date based on prior content viewing patterns for a similar time slot (e.g. similar time of day, day of week, season, etc.).

With continued reference to FIG. 2, other examples of time-dependent preferences defined for the device profile associated with the television device can be determined. For example, it may be determined that on Saturday from 12 to 3 pm, during college football season, there may be a preference for watching college football. Therefore, the device profile will define such a preference, and the recommendation engine will recommend college football on Saturdays from 12 to 3 pm during college football season. Additionally, it may be determined from analyzing the viewing history that there is not only a preference for college football, but a preference for watching a specific team's games. Therefore, the device profile may define a preference for the specific team, and the recommendation engine utilizing the device profile may recommend the specific team's football games when available, and possibly other types of sports from the same college when available. In a similar manner, the device profile might define a preference for watching professional football on Sundays between 12 and 4 pm. Accordingly, the recommendation engine utilizing the device profile may tend to recommend professional football on Sundays between 12 and 4 pm. Furthermore, the device profile may define a preference for a specific professional football team, thereby resulting in the specific professional football team's games being prioritized for recommendation.

With continued reference to FIG. 2, analysis of the viewing history associated with the television device may reveal a preference for reality television shows on Monday and Wednesday nights, and therefore the device profile may define a preference for reality television shows on these nights of the week. It will be appreciated that the device profile may also define a preference for one or more specific reality television shows which have been determined to be watched on the television device. Similarly, it may be determined that dramas tend to be watched on the television on Sunday and Thursday nights, and therefore, the device profile may define a preference for dramas and/or specific drama shows on Sunday and Thursday nights. The recommendation engine may therefore tend to recommend dramas on Sunday and Thursday nights based on the device profile's settings.

The foregoing examples of preferences defined by a device profile are provided by way of example only, and are intended to be merely representative of some types of time-dependent preferences which may be defined by a device profile. It will be appreciated that there are numerous kinds of programing or content available for viewing on a given television device, and that all such content can be classified and a time-dependent preference for such content can be defined in a device profile based on analysis of the viewing history of content on the television device. Merely by way of example, a given content item can be classified by genre (e.g. comedy, drama, news, sports, action, honor, reality, game, cartoon, documentary, science fiction, etc.), an actor, a writer, a director, a channel on which it is broadcast, a target audience (e.g. age, gender, etc.), language, length (running time), date of original airing or release, subject matter, character type, age rating, or any other descriptive aspect of content that may be viewed on a television device. Thus, analysis of viewing history which reveals a preference for a particular content item, such as a particular show or movie may define a preference for any associated descriptive aspect which applies to the particular content item. For example, if a preference for the television show "Friends" is determined to exist, then preferences for various descriptive aspects of "Friends" may also be defined in a device profile, such as preferences for situation comedies, shows from a similar time period (the years 1994 to 2004), content featuring any of the primary actors (e.g. Jennifer Aniston, Courteney Cox, Matthew Perry, Lisa Kudrow, etc.), content having a setting in New York City, etc. Furthermore, such preferences may be defined in a time-dependent manner so as to be associated with the specific times at which "Friends" tends to be watched on the television device.

It will be appreciated that the device profile can be independent of an identified user, as the device profile is associated to a specific television device. Even if there are multiple users of a specific television device, it is possible according to principles in accordance with the present disclosure to provide seemingly user-specific content recommendations without actually identifying a specific user of a television device. Indeed, identification of a specific user of a television device may be impractical or difficult, as there are often multiple users of a single television device with varied interests. However, since a given one of the multiple users is likely to watch content on the television device in a recurring manner that can be defined by a cyclical schedule, then by ascertaining a cyclical schedule of content preferences for the specific television device, it is possible to provide content recommendations that are specific to each of the multiple users.

Figure 3:
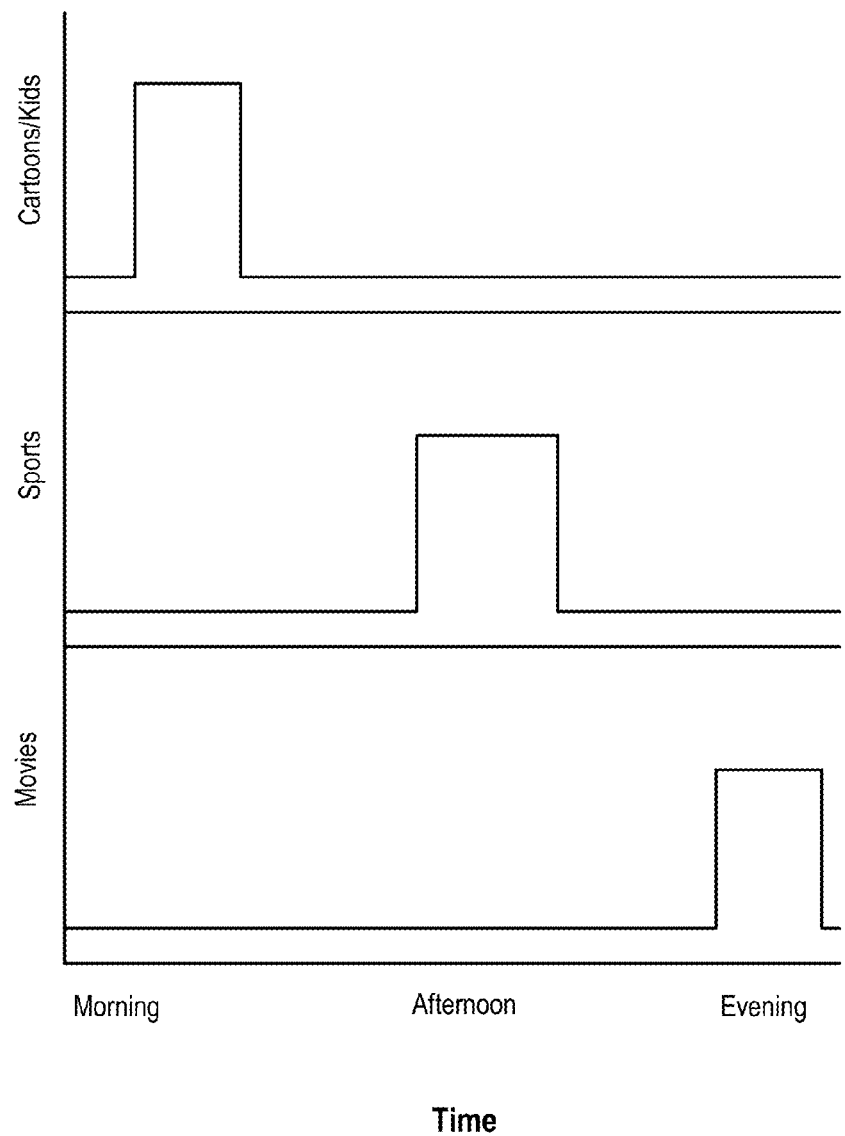
FIG. 3 illustrates a graph showing content preference weights over time, in accordance with an embodiment of the invention.

It will be appreciated that a time-dependent device profile can be defined in various ways without departing from the scope of the present disclosure. In some embodiments, a device profile may define various preference weights over time. FIG. 3 illustrates a graph showing content preference weights over time, in accordance with an embodiment of the invention. Various content preference weights are shown as determined based on the exemplary cyclical viewing schedule described at FIG. 2 for Saturday. As cartoons tend to be viewed from 8 to 10 am on Saturdays, then the device profile may define an increased weighting for cartoons or kids programming on Saturday mornings. Similarly, as college football tends to be viewed on Saturdays between 12 and 3 pm, then the device profile may define an increased weighting for sports on Saturday afternoons. And as movies tend to be viewed between 9 and 11 pm on Saturdays, then the device profile may define an increased weighting for movies on Saturday evenings. Such weights as are defined by the device profile can be applied to evaluate content for viewing. Thus, for example, if the current time/date is some time on a Saturday morning, then as the weighting for cartoons and kids programming is high during this time, whereas the weighting for other programming types is low during this time, then the recommendation engine will evaluate available content and apply a greater weighting to cartoons and kids programming than other types of content, with the result being that cartoons and kids programming will tend to be provided as recommendation results on Saturday mornings.

When a linear television program is in progress, a user may be interested in such a program to various degrees depending upon the type of content being broadcast and the amount of the television program that has already elapsed. For example, it may be the case that the longer a program is in progress, then the less likely it becomes that a user will watch the remainder of the program. This may be due to increasing difficulty of understanding a program the longer it is in progress. Therefore, a relevance threshold can be defined for a given type of content which defines an amount of the content that has elapsed after which the content will no longer be considered relevant for purposes of recommendation.

Figure 4A:
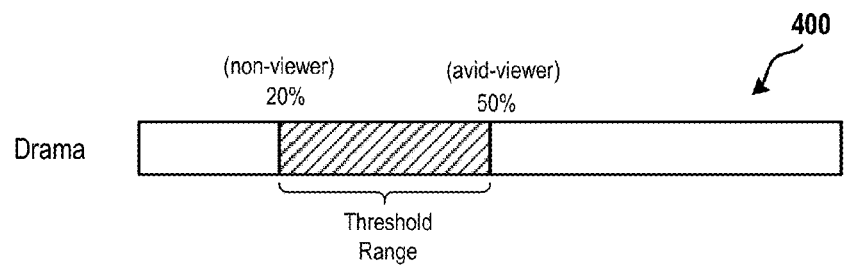
FIG. 4A conceptually illustrates a relevance threshold range for a drama program, in accordance with an embodiment of the invention.

FIG. 4A conceptually illustrates a relevance threshold range for a drama program, in accordance with an embodiment of the invention. The entire duration of a given episode of a drama program is graphically represented by the bar 400. By way of example, a relevance threshold of between 20% and 50% may be defined for the drama program. That is, if the relevance threshold is defined at 20%, then after 20% of the drama program is over, the drama program is no longer considered relevant for purposes of recommendation, and will therefore not be recommended for viewing. The relevance threshold range may establish an overall range for the program, whereas the specific threshold value defined for a given television device or user at any given moment in time may depend on various factors. For example, the relevance threshold may be higher for a television on which the program is regularly watched versus a television on which the program is watched less regularly or not at all. If a user is identified, then similarly, the relevance threshold of a user who regularly views the program may be higher than the relevance threshold of a user who views the program less regularly or not at all.

The specific threshold may also depend upon time-dependent content preferences as discussed herein, such that a higher threshold will be defined for content having a higher weighting (or that is otherwise defined to be preferred) at the current date and time versus other times when the content may have a lower weighting. In this manner, the relevance threshold will also vary over time. For example, with reference again to the viewing schedule described at FIG. 2, it may be determined that drama programs are preferred on Sunday and Thursday nights, and therefore the relevance threshold for drama programs will be defined at a higher values on Sunday and Thursday nights than on other nights of the week.

Figure 4B:
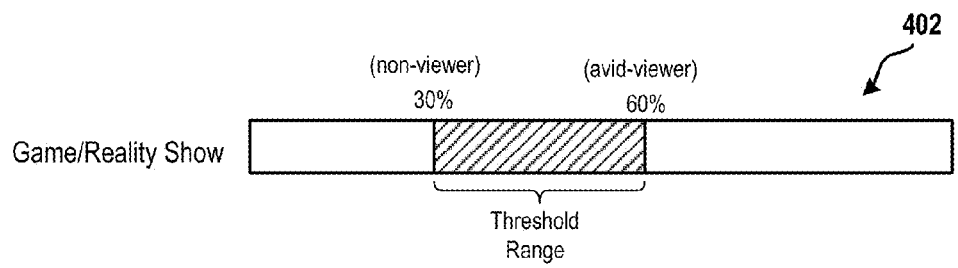
FIG. 4B conceptually illustrates a relevance threshold range for a game show, in accordance with an embodiment of the invention.

It should be appreciated that different types of content may have different relevance thresholds or relevance threshold ranges defined, as the difficulty of following a program that is already in progress may vary from one genre or specific content item to the next. For example, FIG. 4B conceptually illustrates a relevance threshold range for a game show, in accordance with an embodiment of the invention. The duration of an episode of the game show is graphically represented by the bar 402. In one embodiment, the relevance threshold for the game show ranges between 30% and 60% of the duration of the game show. The relevance threshold (and threshold range) for the game show may be higher than that of the drama program because the drama program may have a more linear storyline that renders it more difficult to follow for a given fraction that has elapsed versus a game show.

In another embodiment, various periods of relevance and non-relevance may be defined for a linear television program for purposes of evaluating it for recommendation. The concept is related to the relevance threshold previously discussed, but also allows for greater flexibility. For example, having a relevance threshold set to 50% would be equivalent to designating the first half of a program as relevant and the second half of the program as non-relevant. Thus, if at the current time, the program is in progress at a point which lies within the first half of the program, then the program is considered relevant for purposes of recommendation; whereas if at the current time, the program is in progress at a point that lies within the second half of the program, then the program is considered not relevant for purposes of recommendation. It will be appreciated that a given linear television program may have multiple periods of relevance or non-relevance defined.

Figure 4C:
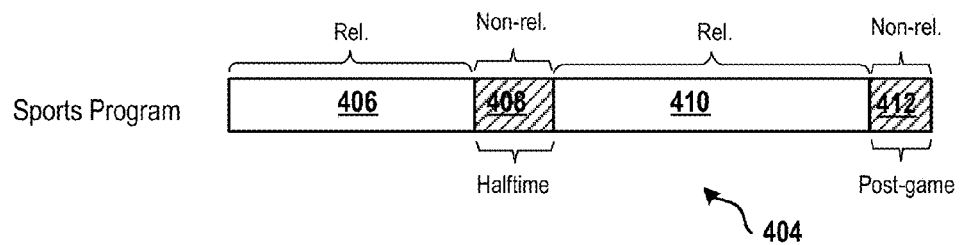
FIG. 4C conceptually illustrates various periods of relevance and non-relevance for a sports program, in accordance with an embodiment of the invention.

For example, FIG. 4C conceptually illustrates various periods of relevance and non-relevance for a sports program, in accordance with an embodiment of the invention. The entire duration of the sports program is graphically represented by the bar 404, and may include two periods of play (a first half and a second half), a halftime show defined between the periods of play, and a post-game show defined after the second period of play. In the illustrated embodiment, the periods 406 and 410 corresponding to the first half and second half, respectively, are defined to be relevant for recommendation, whereas the periods 408 and 412, corresponding to the halftime show and the post-game show, respectively, are defined to be non-relevant for recommendation. Therefore, if at the current time, either of the first or second half is currently in progress, then the sports program may be considered relevant for recommendation (and may therefore be recommended for viewing), whereas if at the current time either of the halftime show or the post-game show are currently in progress, then the sports program is considered to be not relevant for recommendation (and will therefore not be recommended for viewing).

It should be appreciated that a given television program may have any number of periods of relevance and non-relevance associated therewith, each of any specific duration, and being arranged in any fashion, so as to correspond time periods during the airing of a program for which a viewer may be likely to be interested or disinterested in viewing the program (i.e. during periods of relevance a viewer may be more likely to be interested in viewing the program, whereas during periods of non-relevance a viewer may be less likely to be interested in viewing the program). Furthermore, the periods of relevance or non-relevance may be determined in part based on recurring cyclical viewing patterns and preferences as are discussed elsewhere herein.

Figure 5A:
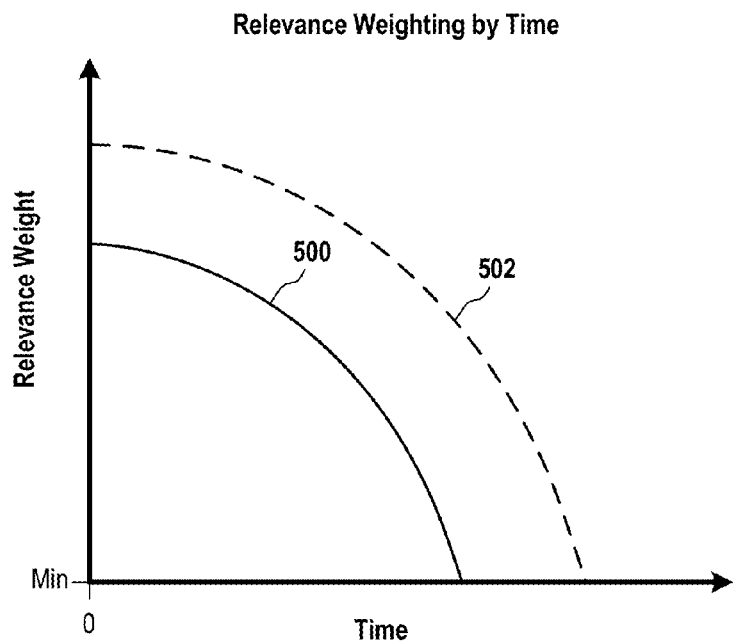
FIG. 5A illustrates a graph showing relevance weighting versus elapsed time for a linear television program, in accordance with an embodiment of the invention.

In a related embodiment, a relevance weighting can be defined for a given linear television program, and the relevance weighting may vary as a function of the elapsed time of the program. The relevance weighting can be applied to evaluate currently in-progress programming for purposes of recommendation. By way of example, FIG. 5A illustrates a graph showing relevance weighting versus elapsed time for a linear television program, in accordance with an embodiment of the invention. A curve 500 defines the relevance weighting for the television program as a function of elapsed time that may be applied for a given television device or user. In the illustrated embodiment, the curve 500 is constructed so that the relevance weighting declines less rapidly as a function of time during an earlier portion of the program, but the relevance weighting declines more rapidly as a function of elapsed time during a later portion of the program. The relevance weighting declines to a minimum value after a certain elapsed time is reached, the relevance weighting thereby being equal to the minimum value for the remaining duration of the program. The curve 502 defines the relevance weighting as a function of elapsed time that may be applied for a television device or user that is determined to have a greater preference for the program than that represented by curve 500. As can be seen, the curve 502 is constructed so as to exhibit a higher relevance weighting for a given elapsed time than the curve 500, until the relevance weighting also declines to the minimum value. However, the elapsed time at which the relevance weighting declines to the minimum value is greater for the curve 502 than the curve 500.

Figure 5B:
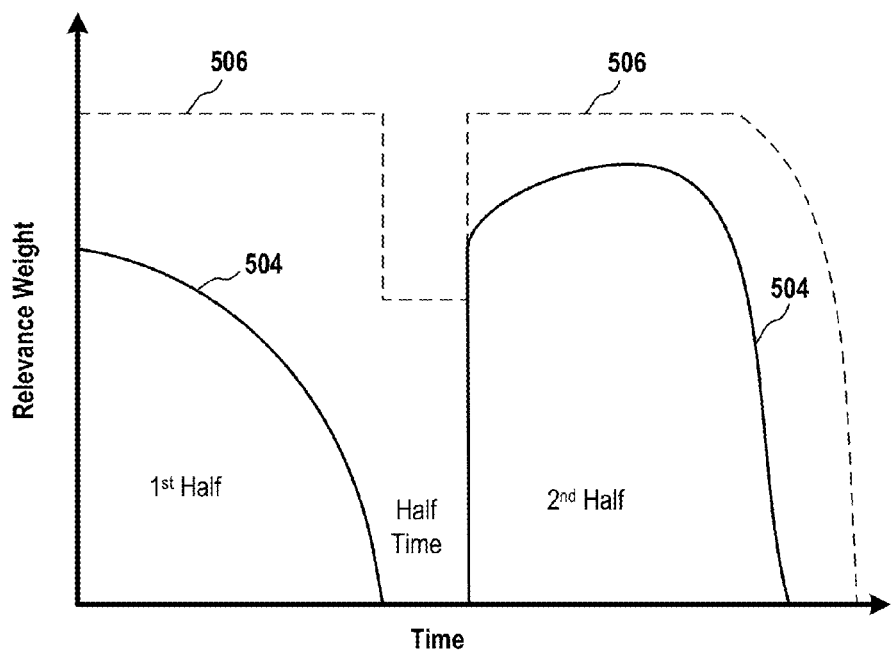
FIG. 5B illustrates a graph showing relevance weighting versus elapsed time for a linear television broadcast of a sporting event, in accordance with an embodiment of the invention.

FIG. 5B illustrates a graph showing relevance weighting versus elapsed time for a linear television broadcast of a sporting event, in accordance with an embodiment of the invention. The curve 504 illustrates relevance weighting as a function of elapsed time for a given television device or user. As shown, during the first half of the sporting event the curve 504 is defined so that relevance weighting declines over the course of the first half, declining to a minimum value at half time. The relevance weighting is defined at the minimum value for the duration of the half time. At the start of the second half, the relevance weighting is defined at a level similar to that defined at the beginning of the first half. During the course of the second half, the relevance weighting may actually increase as the play may become more exciting during the second half when the outcome of the sporting event is likely to be determined. Towards the end of the second half, the relevance weighting may decline to the minimum value.

Another curve 506 may define the relevance weighting as a function of time for a television device or user for which a higher preference for the sporting event is determined to exist. The preference may be a preference for the sport, for one of the teams or players participating in the event, or some other aspect of the sporting event. As shown, the curve 506 defines the relevance weighting to be maintained at a level that is higher than that of curve 504 throughout the broadcast of the sporting event. During the first and second halves, the relevance weighting is fairly constant at a high level, and during half time the relevance weighting is defined at level above the minimum value for relevance weighting.

It should be appreciated that the exemplary relevance curves thus described have been provided by way of example, and not by way of limitation. In various embodiments, the relevance weighting as a function of elapsed time can define any curve or sequence of values designed to predict the likelihood as a function of elapsed time that a viewer of a television device will be interested in a given linear television program.

Figure 6:
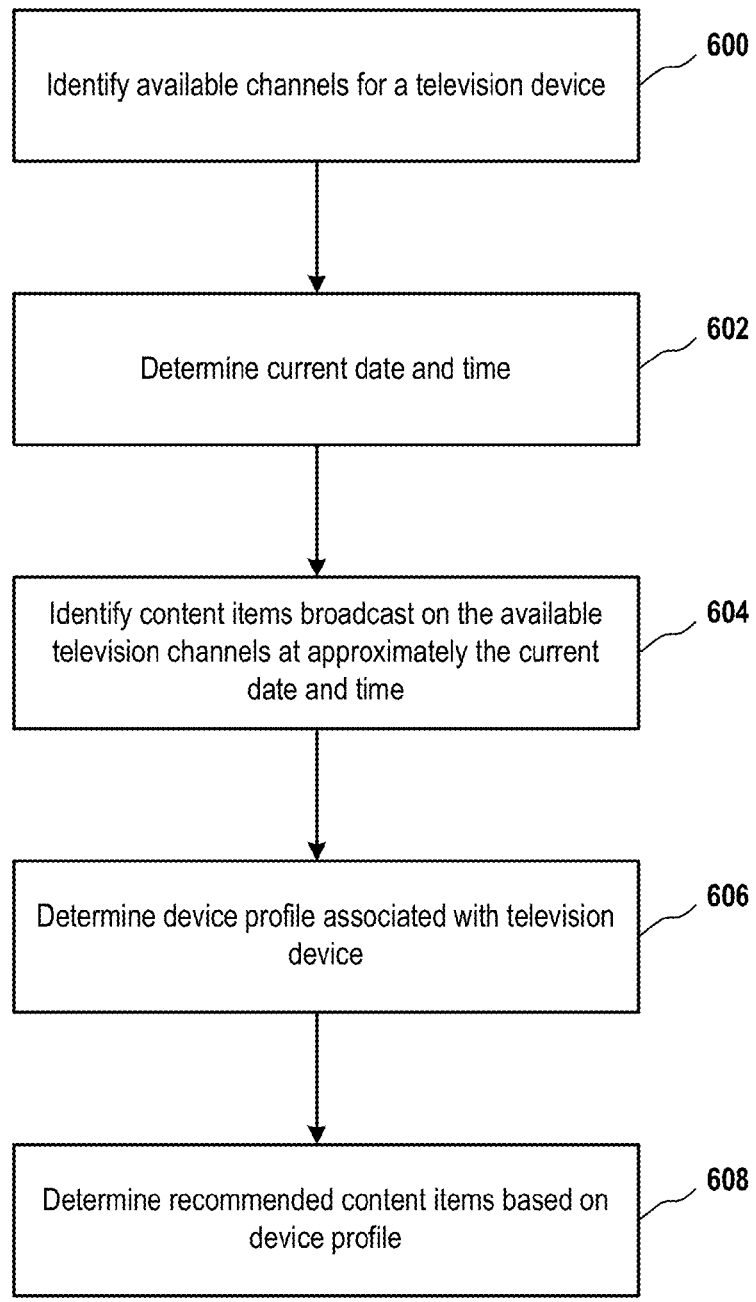
FIG. 6 illustrates a method for recommending television content for a television device, in accordance with an embodiment of the invention.

FIG. 6 illustrates a method for recommending television content for a television device, in accordance with an embodiment of the invention. At method operation 600, available television channels for a television device are identified. At method operation 602, a current date and time are determined. At method operation 604, a plurality of content items that are broadcast on the available television channels at approximately the current date and time are identified. At method operation 606, a television profile associated with the television device is determined, the television profile being time-dependent. At method operation 608, recommended content items are determined from the plurality of content items based on the television profile of the television device.

The television profile may define a schedule of content preferences. Furthermore, the schedule of content preferences may define a cyclical timeline of preference values for each of a plurality of content categories. Recommended content items may be determined at least in part by determining current content preferences as defined by the schedule of content preferences for the current date and time, and identifying ones of the plurality of content items matching the current content preferences.

The television profile may define an association between a preferred content category and both a day of the week and a time of day.

The recommended content items may be determined at least in part by identifying an elapsed amount of each of the plurality of content items that is already in progress, and determining whether the elapsed amount exceeds a predefined relevance threshold, or determining a relevance factor based on the elapsed amount.

In one embodiment, a user of the television device can be identified, and a user profile associated to the user of the television device may be retrieved. The recommended content items may be determined at least in part based on the user profile. The user profile may be defined based on internet activity associated with the user.

In one embodiment, samples of content rendered on the television device are received. The samples are analyzed to identify watched content items associated with the television device. The television profile can be generated based on the watched content items. In one embodiment, the samples are defined by audio portions from the content rendered on the television device, and the audio portions are analyzed to identify the watched content items associated with the television device. Furthermore, the available television channels can be determined based on the watched content items.

In one embodiment, the recommendations are provided to an application configured for execution on the television device. The application may be unaffiliated with a service provider that provides the television channels to the television device.

Figure 7:
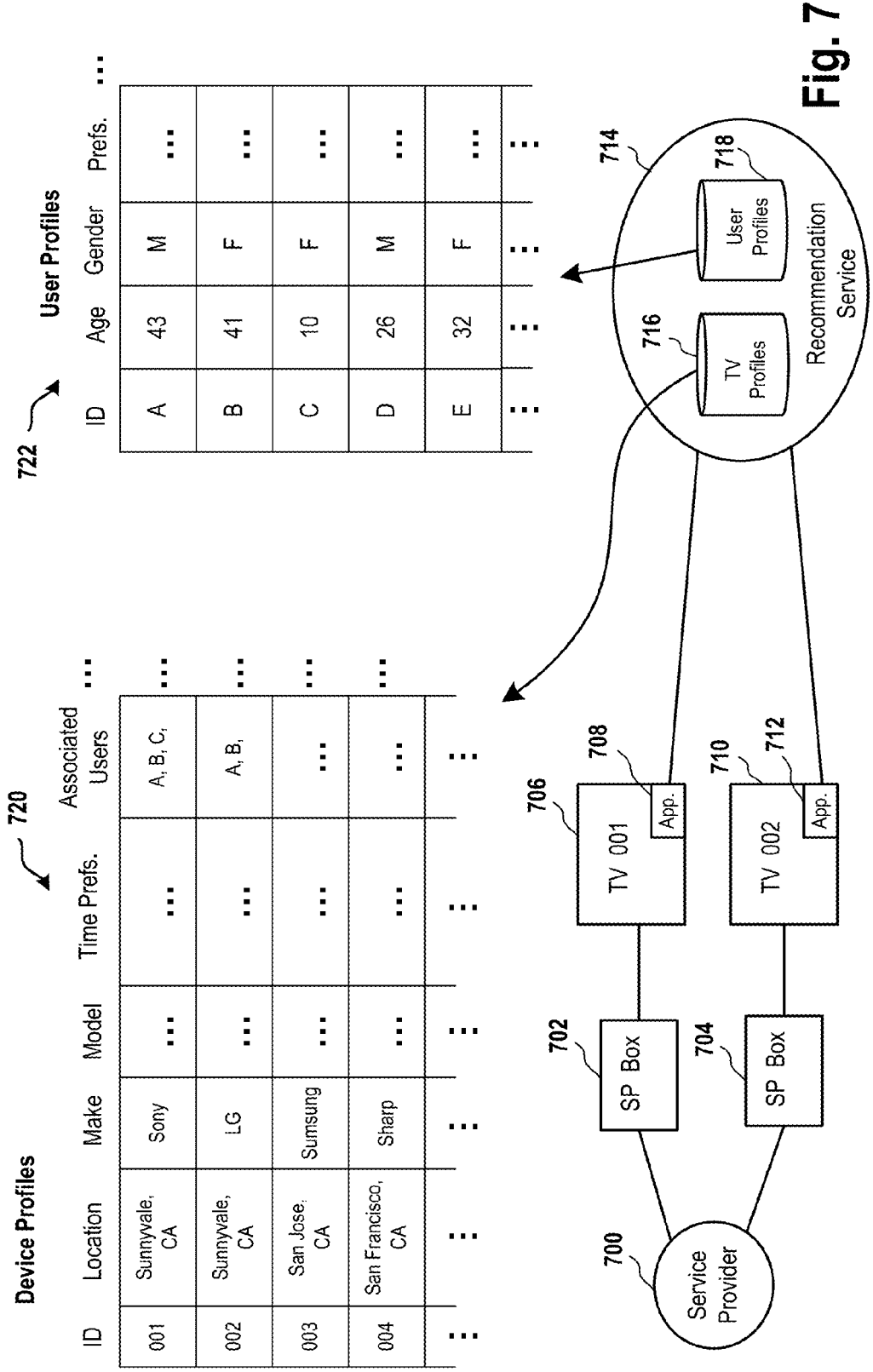
FIG. 7 conceptually illustrates a system for providing television content recommendations, in accordance with an embodiment of the invention.

FIG. 7 conceptually illustrates a system for providing television content recommendations, in accordance with an embodiment of the invention. As shown, a service provider 700 provides data signals to provide content for viewing on a television 706. The data signals may be encoded with content, and therefore a service provider box 702 can be configured to receive the data signals from the service provider, and decode the data signals to extract specific content. In some embodiments, this process can be characterized as "tuning" to a specific television channel. The service provider box 702 may be configured to output video and audio signals for rendering by the television 706. It should be appreciated that the service provider box 702 may be characterized as various types of devices, such as a tuner box, a cable box, a set top box, a receiver box, and other types of devices which are configured to receive data signals from a service provider and decode them for viewing on a television. Furthermore, the service provider box 702 may include various types of functionality, such as recording/playback of content (DVR functionality), a programming guide, on-demand streaming of content from the service provider, etc. It should be appreciated that in some embodiments, some or all of the functionality of service provider box may be included in the television itself. For example, televisions often include signal tuners which are capable of decoding signals to render content from various channels.

The television 706 can be configured to execute applications to provide additional functionality to the viewer. In one embodiment, the application 708 is configured to recommend content for viewing on the television 706. Broadly speaking, the application 708 communicates with a recommendation service 714 to receive content recommendations for the television 706. The recommendation service may access a television profile associated with the television 706, stored in television profiles storage 716. The recommendation service provides recommendations which are based on the television profile for the television 706. As discussed herein, the television profile can be time-dependent, and may therefore identify different content preferences associated with the television 706 depending upon the time of day, the day of the week, or other time-dependent paradigms. The television profiles storage 716 may define a table 720 of television profiles. Merely by way of example, a given television profile may include various types of information, such as an ID, a location, a make, a model, various time-dependent content preferences, and associated users. It should be appreciated that there may any number of additional types of information included in a television profile, and that the exemplary embodiment is provided for illustrative purposes and not by way of limitation.

Furthermore, the recommendation service 714 can provide content recommendations based in part on a user profile associated with an identified user of the television 706. The user profile can be stored in a user profiles storage 718. In one embodiment, the user profiles storage 718 defines a table of user profiles. By way of example, a user profile may be defined by various types of information, such as an ID, an age, a gender, a location, content preferences, income level, etc. It should be appreciated that the user profile may include any of various other kinds of information about a user.

The recommendation service 714 determines recommended content for viewing on the television 706 based on either or both of the television profile associated with the television 706 and the user profile associated with an identified viewer of the television 706. The content recommendations are provided to the application 708 executing on the television 706. The application 708 provides the content recommendations to the viewer via an interface displayed on the television 706.

Additionally, it will be appreciated that there may be any number of television devices serviced by the recommendation service. For example, another television 710 may be defined, with an associated service provider box 704, and an application 712 executing on the television 710. In some instances there may be multiple televisions which are located in the same locale, such as a single house. As each television may have its own associated television profile that is time-dependent, it is possible within such a household to provide content recommendations based on time-dependent content preferences associated to each television. By way of example, television 706 might be located in a family room of a house, whereas television 710 is located in a bedroom of the same house. The viewing preferences as a function of time will be different for each of the television 706 and the television 710, even though they may be watched by the same user. However, according to the principles described herein, it is possible to provide appropriate recommendations based on time-dependent content preferences across multiple televisions. Thus, even if the user is not specifically identified, content recommendations which reflect the user's watching habits on different televisions at different times can be provided.

Additionally, it will be appreciated that a time-dependent profile may be shared across multiple television devices. For example, there may be multiple television devices which are associated to a same user account. It should be appreciated that association of a television to a given user account may not be indicative of the actual viewers of the television at any given time, as there may be multiple viewers in a household, all of whom utilize the same television that is associated to the given user account. However, a time-dependent device profile can be defined collectively for the multiple television devices which are associated to the user account. In this manner, the time-dependent device profile is applied to effect content recommendations on any one of the multiple television devices.

Furthermore, a time-dependent device profile can be transferred from being associated with a first television to being associated with a second television. For example, if a user buys a new television and wishes to retain the time-dependent device profile that has been built up over time for his/her old television, then the existing time-dependent device profile for the old television can be reassigned to the new television. In this manner, the user may enjoy continuity in terms of content recommendations based on their existing time-dependent device profile.

Figure 8:
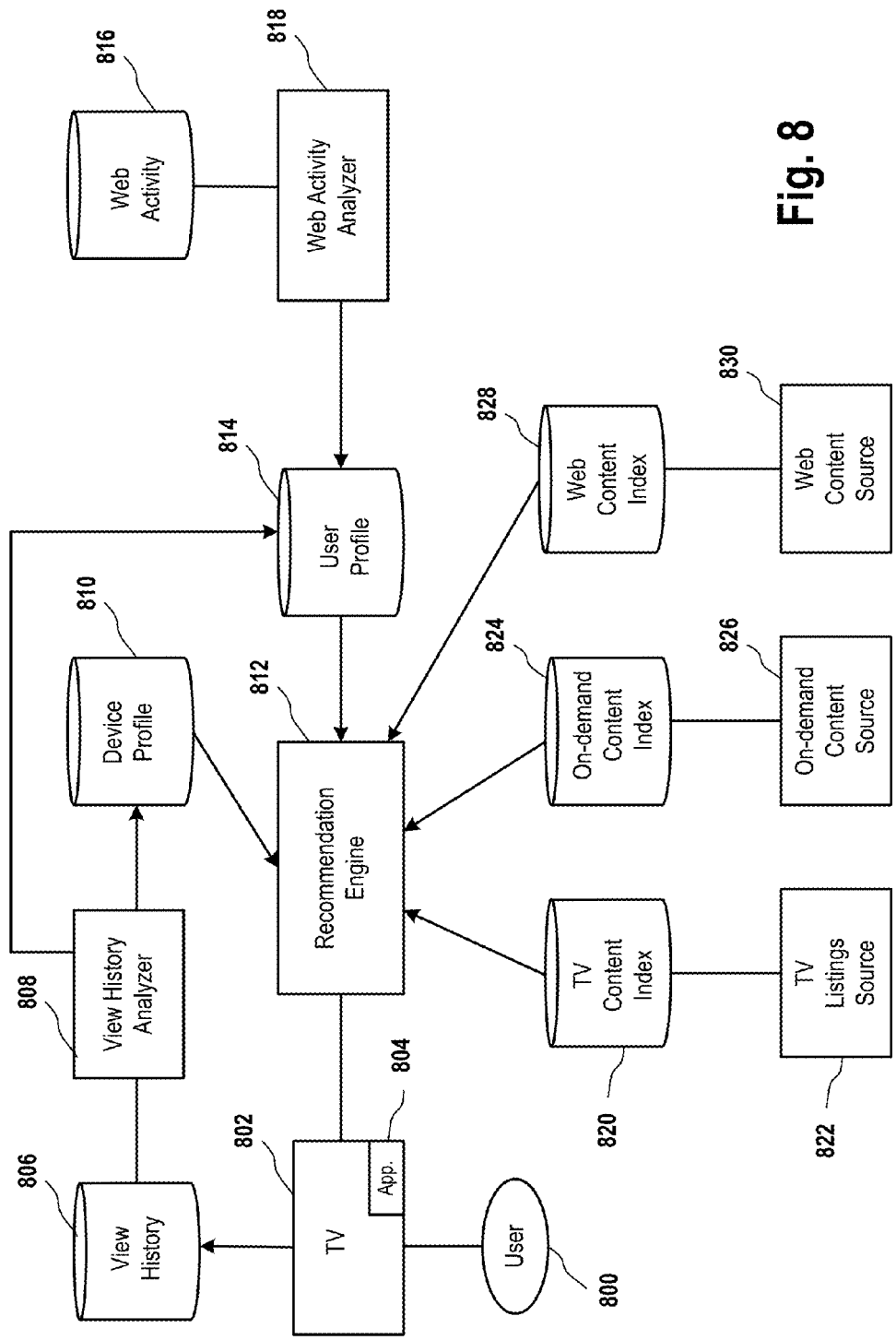
FIG. 8 illustrates a system for recommending content for viewing on a television device, in accordance with an embodiment of the invention.

FIG. 8 illustrates a system for recommending content for viewing on a television device, in accordance with an embodiment of the invention. A user 800 views content on a television 802. The television 802 is configured to execute an application 804 that provides an interface for presenting recommended content items on the television 802. A viewing history of the television 802 which identifies content items that have been viewed on the television 802 and the times at which such content items were viewed is stored in a view history storage 806. The viewing history of the television 802 can be analyzed by a view history analyzer 808 to determine a device profile associated with the television 802 that is stored in a device profile storage 810. As discussed elsewhere herein, the device profile can identify time-dependent content preferences associated with the television 802. Thus, the view history analyzer 808 can be configured to analyze the viewing history of the television 802 to identify the time-dependent content preferences. These may be identified in part based on identification of recurring patterns of content viewing. The analysis may entail analysis of any aspect, type, or other metadata classification according to which identified viewed content can be classified. Content preferences may identify specific content items, such as specific shows or movies, as well as more generic classifications, such as certain genres of content.

The device profile may also identify channels which are available for viewing on the television. In one embodiment, the view history analyzer 808 is configured to analyze the viewing history of the television in order to identify available channels and sources of content. For example, there may be a linear television content index 820 which contains information about programming available on various television channels. The linear television content index may contain information retrieved from a television listings source 822. The television listings source can be defined by a listings provider, a signal provider, or any other source of information about available linear television content. For a given linear television program or content item, such information may include a title, broadcast date and times (start and end times), a channel on which the program is broadcast, duration/length (running time), a summary, actors, a director, a genre, a screenshot, a season, an episode number, a date of first airing, etc.

An on-demand content index 824 contains information about available on-demand content. Such information may be retrieved from an on-demand content source 826, which may be defined by an on-demand content provider or other source of such information. The information can include data similar to that described above with reference to the linear television content index (excepting a television channel and broadcast time, as these generally do not apply to on-demand content). A web content index 828 contains information about available web content, which may be retrieved from a web content source 830.

The recommendation engine 812 is configured to recommend content from the available content as identified in the linear television content index 820, the on-demand content index 824, and the web content index 828. The recommendation engine 812 can evaluate the available content based on the content preferences defined at the current date and time in accordance with the time-dependent device profile associated with the television 802. In one embodiment, the recommendation engine is configured to rank available content items based on the current content preferences. The top-ranked available content items (possibly subject to constraints) can be identified as content recommendations for the television 802. The content recommendations are transmitted to the application 804 for presentation on the television 802 to the user 800.

It may be possible to identify the user 800 of the television 802, and accordingly, a user profile associated with the user 800 can be determined. The user profile can be generated/updated by a web activity analyzer which analyzes web activity of the user stored in a web activity storage 816. The user profile can be stored in a user profile storage 814. The user profile may define any of various aspects of the user, such as demographic information, content preferences, and other kinds of information about the user. When a user is identified who has an associated user profile, the recommendation engine can be configured to determine the content recommendations based at least in part on the user profile, in addition to the device profile previously described. It will be appreciated that a user profile may capture additional preferences of the user that may not be fully realized from the device profile alone, and therefore application of the user profile for purposes of determining recommended content for viewing on the television can yield more comprehensive recommendations than would otherwise be possible based on the device profile alone.

It is generally contemplated that the systems described with reference to FIGS. 7 and 8 can be implemented across various types of client/server architectures, wherein the application executing on the television device functions as a client within such architectures, and accesses the additional components and resources described herein over one or more networks. Such networks can include any type of network, including local and wide-area networks, wired and wireless networks, etc. Furthermore, the various components and functionality thus described can be flexibility distributed across such networks, without limitation. It will be appreciated that there can be many client television devices having applications defined thereon that are serviced by a remote recommendation service/engine. In alternative embodiments, it is noted that some of the functionality described herein can be included in or otherwise performed by the application executing on the television device.

Figure 9A:
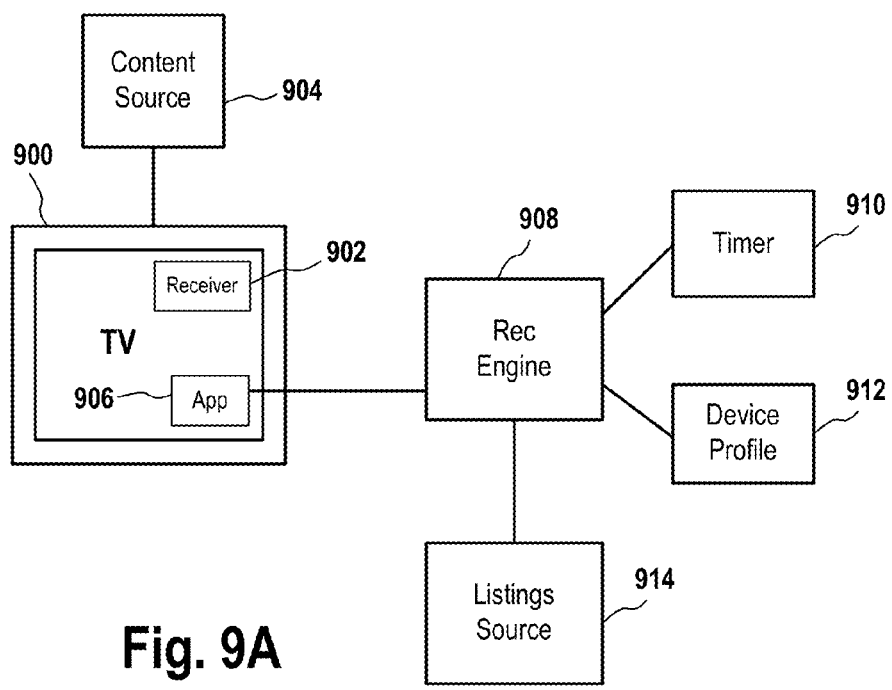
FIG. 9A illustrates a system for recommending content for viewing on a television device, in accordance with an embodiment of the invention.

FIG. 9A illustrates a system for recommending content for viewing on a television device, in accordance with an embodiment of the invention. The television 900 includes a receiver configured to receive channels through which content is presented. The television 900 is also configured to execute an application 906 which presents content recommendations to a viewer. The application 906 interfaces with a recommendation engine 908 which provides the content recommendations to the application 906 for presentation. The recommendation engine 908 is configured to receive a current date and time from a clock 910, and a device profile 912, and generate in response a recommendation of content items for viewing. The recommendation engine utilizes information about available content items for viewing from a listings source 914. The available content items can include content items which are currently on-air/in-progress, and or which will be broadcast shortly (e.g. within the next 10 minutes). In some embodiments, the available content items include content items which will be broadcast at a later time than the current date and time. If such content is recommended to the user, then the user may thus be informed of its future airing ahead of time, so that the user may plan to watch it or record it.

Figure 9B:
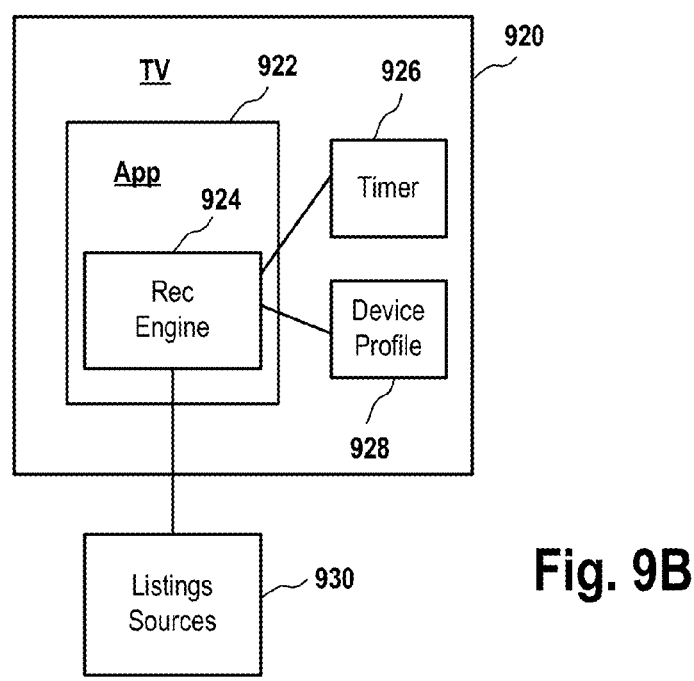
FIG. 9B illustrates a system for recommending content for viewing on a television, in accordance with an embodiment of the invention.

It should be appreciated that in various embodiments the functionality described herein may be embodied in different portions of a system which may be included within, local to, or remote from, a television device. For example, FIG. 9B illustrates a system for recommending content for viewing on a television, in accordance with an embodiment of the invention. As shown, the television 920 includes an application 922 which is configured to present content recommendations to the viewer on the television 920. The application 924 includes a recommendation engine 924 that is configured to generate content recommendations based on the current time and date provided by a clock 926, and a device profile 928 stored at the television 920 in a storage device. The recommendation engine 924 may access a listings service 930 to retrieve listings data which describes content items that are available for viewing on the television 920.

Figure 10:
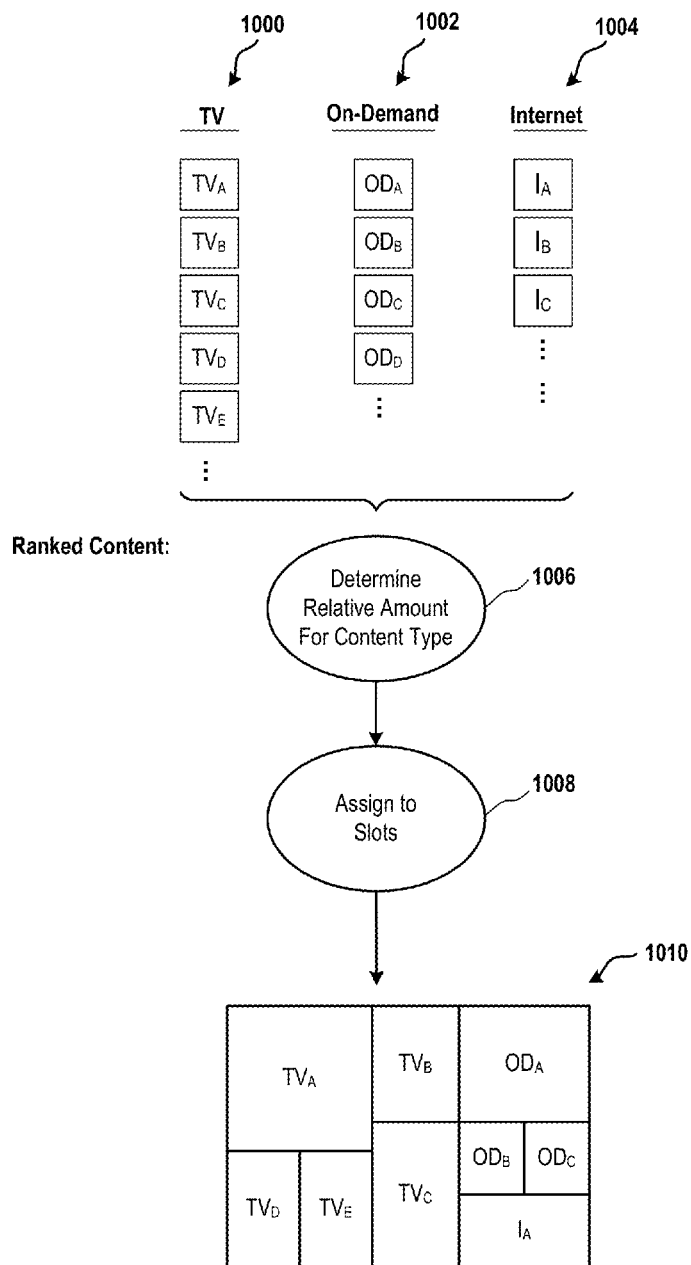
FIG. 10 conceptually illustrates a method for presenting content recommendations to a viewer of a television device, in accordance with an embodiment of the invention.

FIG. 10 conceptually illustrates a method for presenting content recommendations to a viewer of a television device, in accordance with an embodiment of the invention. As shown, various types of content can be ranked for purposes of recommendation. For example, various broadcast television content items (ref. 1000) may be ranked in the following order of priority for purposes of recommendation: $TV_A$, $TV_B$, $TV_C$, $TV_D$, etc. In other words, if broadcast television content is to be recommended to the user, then the broadcast television content item $TV_A$ is ranked first for recommendation followed by $TV_B$, $TV_C$, $TV_D$, etc. Similarly, as shown, various on-demand content items (ref. 1002) may be ranked in the following order of priority for purposes of recommendation: $OD_A$, $OD_B$, $OD_C$, $OD_D$, etc. And various Internet content items (ref. 1004) may be ranked as follows: $I_A$, $I_B$, $I_C$, $I_D$, etc. The ranked order determines the priority given to a given content item within its content class (broadcast television, on-demand, or Internet). Thus, for example, if the top three content items from each class are to be recommended to a user, then the user will be presented with broadcast television content items $TV_A$, $TV_B$, and $TV_C$, on-demand content items $OD_A$, $OD_B$, and $OD_C$, and Internet content items $I_A$, $I_B$, and $I_C$.

However, in some embodiments, the relative amount of a given content class/type that is recommended to the user may vary. For example, if a user tends to view mostly broadcast television content, but very little Internet content, then it may be desirable to recommend comparatively fewer Internet content items relative to broadcast television content items. The aforementioned device profile may be configured to define preferences for different content classes in a time-dependent manner. For example, a user may tend to watch on-demand content in the evenings more than at any other time, and therefore the device profile of the user's television may define a corresponding preference for on-demand content that is increased in the evenings relative to other times. It should be appreciated that such preferences may be defined as configurable weights, as discreet settings, or any other value or data item which may define such preferences.

In accordance with the foregoing principles, a relative amount for each of various content types to be recommended can be determined (ref. 1006). Based on these relative amounts, then the ranked content items can be assigned to various placement locations (ref. 1008) within a predefined presentation template 1010. The presentation template 1010 defines the format for a user interface to present recommended content items to a viewer for selection. In the illustrated embodiment, the relative amounts of each content type have been determined such that five broadcast television content items, three on-demand content items, and one Internet content item, will be assigned to the placement locations of the template 1010. The content items for a given content type are prioritized for assignment in accordance with their previously determined ranked order. In other words, the highest ranking content items of a given content type are assigned to placement locations within the template until the allotted number of placement locations for the given content type are filled. It will be appreciated that the relative amounts of such content types may vary in accordance with current preferences as defined by the television's corresponding device profile. Furthermore, it is noted that the arrangement or orientation of various placement locations within the presentation template may be defined to have a prioritization or order according to which ranked content items will be assigned.

Figure 11A:
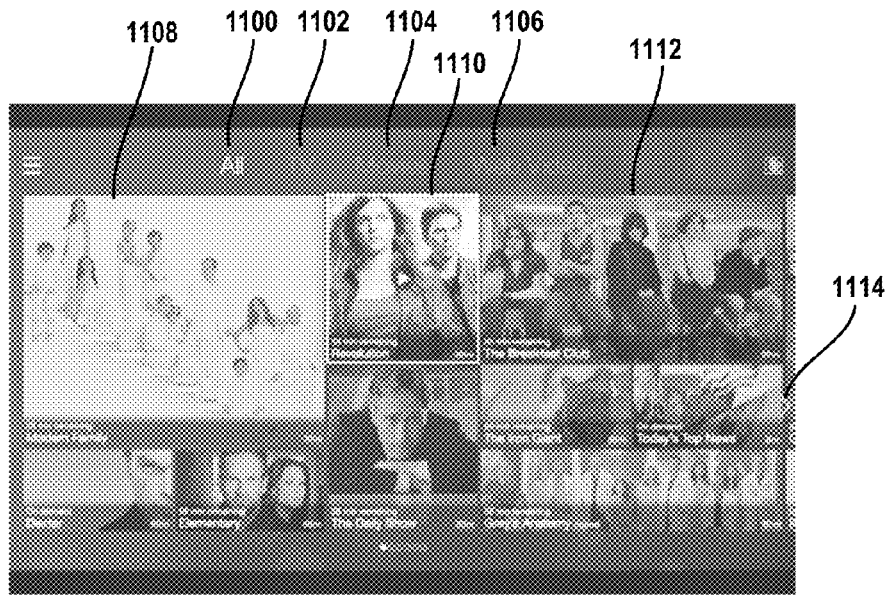
FIG. 11A illustrates an interface displaying recommended content items for viewing on a television device, in accordance with an embodiment of the invention.

FIG. 11A illustrates an interface displaying recommended content items for viewing on a television device, in accordance with an embodiment of the invention. In the illustrated interface, selection options are provided for viewing various kinds of content, including options to view "All" types of content (ref. 1100), "TV" (ref. 1102), "Movies" (ref. 1104), and "Web Video" (ref. 1106). In the illustrated embodiment, the "All" option is currently displayed, and thus, recommended content is presented from all available types of content. Various selectable graphic icons/creatives indicating respective content items are placed at various locations within the interface, including, for example, icon 1108, icon 1104, and icon 1112. For each content item thus represented, a title is provided, as well as length/duration of the content item, and if it is already in-progress, then the amount of time remaining. In the illustrated embodiment, the icon 1104 is currently highlighted, indicating that the user may initiate viewing of the respective content item by indicating selection (e.g. pressing a play/select/enter button on a remote control device).

Figure 11B:
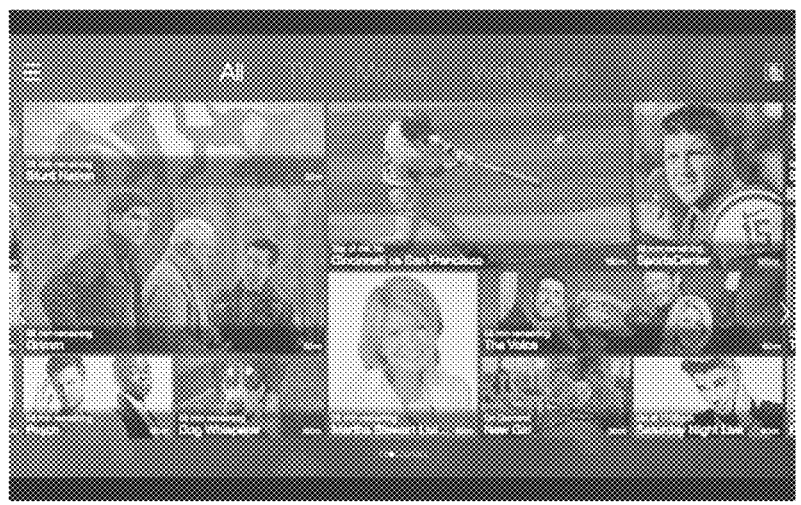
FIG. 11B illustrates a second page of the interface of FIG. 11A, displaying additional recommended content items for viewing on the television device, in accordance with an embodiment of the invention.

In one embodiment, the interface may include multiple pages of content recommendations. Accordingly, a page navigation icon (e.g. arrow 1114) can be selected to shift the view to another page providing access to additional recommended content. FIG. 11B illustrates a second page of the interface of FIG. 11A, displaying additional recommended content items for viewing on the television device, in accordance with an embodiment of the invention.

In the illustrated embodiment, the various content categorizations of TV, Movies, and Web Video, can be construed as identifying the nature of the content itself rather than the source of its presentation. For example, TV content may encompass television shows or series, which are generally defined by a number of episodes that may further be organized into seasons. Such TV content may be broadcast on a television channel, or made available through an on-demand video service, by way of example and not limitation. Similarly, movie content may encompass any movie available for viewing on the television, including movies broadcast on linear television channels, as well as movies presented through an on-demand video service.

In yet another embodiment, content can be available for recommendation and viewing from a DVR. Such content can be recommended in accordance with the principles described herein.

Figure 12A:
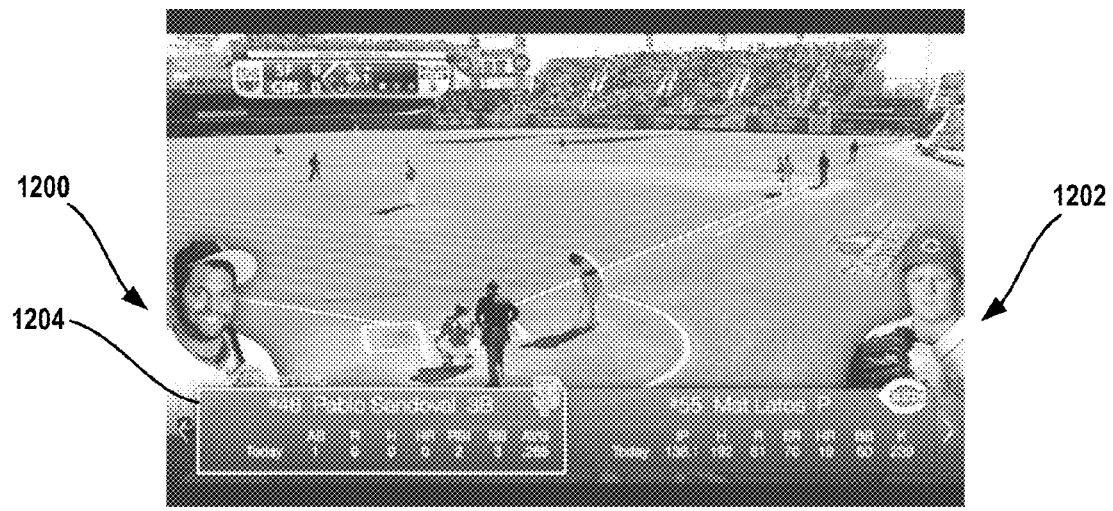
FIG. 12A illustrates presentation of supplemental content related to currently displayed content on a television, in accordance with an embodiment of the invention.

FIG. 12A illustrates presentation of supplemental content related to currently displayed content on a television, in accordance with an embodiment of the invention. In the illustrated embodiment, a baseball game is currently displayed on the television. In accordance with embodiments of the invention, the content being currently displayed on the television can be identified, and supplemental content related to the displayed content can be presented to the viewer. For example, in the illustrated embodiment, at the current time during the presentation of the baseball game, a matchup between a batter and a pitcher is being currently shown. Based on identification of the current time of presentation of the baseball game, and consequent identification of the batter and pitcher, information relating to each player may be presented. As shown, at reference 1200, information about the batter is displayed, including a picture of the batter and various statistics. At reference 1202, information about the pitcher is shown, including a picture of the pitcher and various statistics.

Figure 12B:
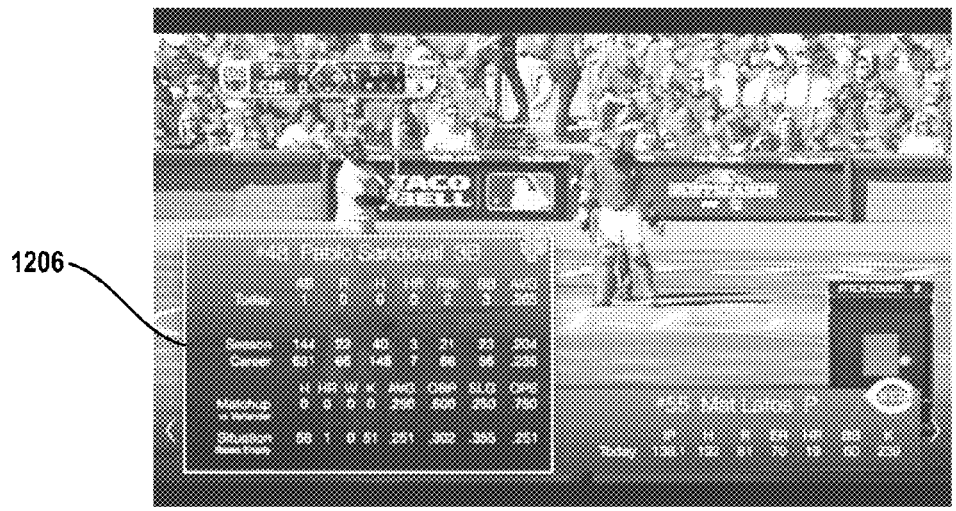
FIG. 12B illustrates the result of selection of the highlighted portion of FIG. 12A, in accordance with an embodiment of the invention.

In the illustrated embodiment, the statistics of the batter are currently highlighted, as indicated by the outline 1204, thereby indicating that the viewer may select the highlighted portion (e.g. by pressing a select/enter button on a remote control) to access additional information. FIG. 12B illustrates the result of selection of the highlighted portion, in accordance with an embodiment of the invention. As shown at FIG. 12B, an expanded presentation of statistics relating to the batter is thereby displayed at reference 1204.

Figure 13:
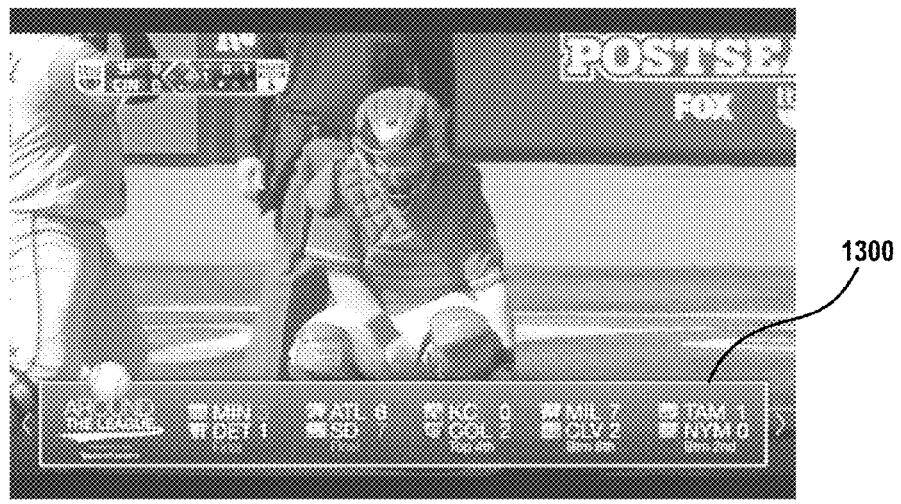
FIG. 13 illustrates scores from various baseball games displayed during a baseball game, in accordance with an embodiment of the invention.

FIG. 13 illustrates scores from various baseball games displayed during a baseball game, in accordance with an embodiment of the invention. A baseball game is in progress and currently displayed on the television. As has been described, the content currently being displayed can be identified and related supplemental content can be presented. In the illustrated embodiment, scores of various baseball games are displayed in the lower portion of the display, as indicated at reference 1300.

Figure 14A:
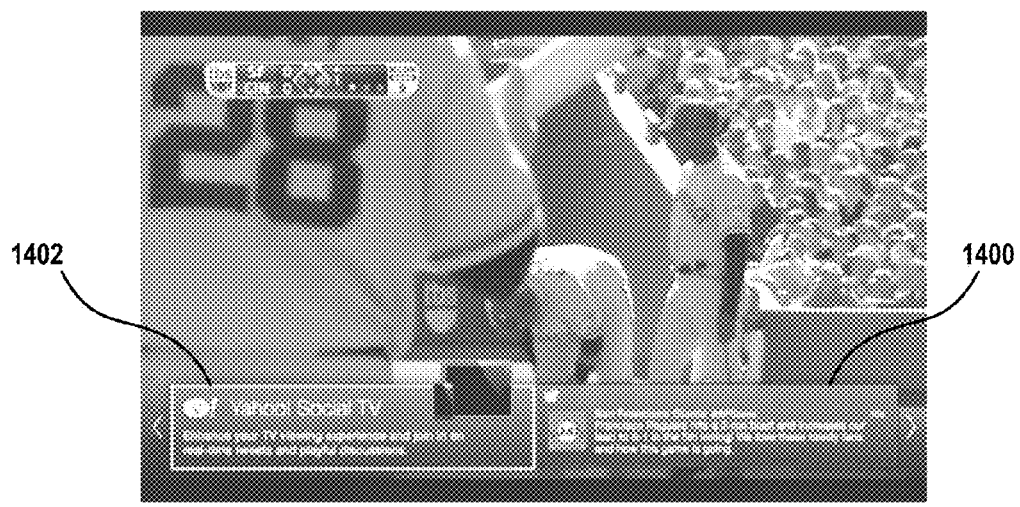
FIG. 14A illustrates social media information displayed in relation to content currently displayed on a television, in accordance with an embodiment of the invention.
Figure 14B:
FIG. 14B illustrates an expanded view of social media posts, in accordance with an embodiment of the invention.

FIG. 14A illustrates social media information displayed in relation to content currently displayed on a television, in accordance with an embodiment of the invention. In the illustrated embodiment, a baseball game is currently displayed on the television. At the lower portion of the display, social media information related to the baseball game is displayed at reference 1400. In one embodiment, the social media information can include posts to a social network, such as a Twitter™ post or a Facebook™ post. A selectable panel is shown at reference 1402, which when selected provides access to additional social media information. Selection of the panel results in the view shown at FIG. 14B. As shown, the view of social media posts has been expanded to show several social media posts. In the illustrated embodiment, a number of Twitter™ posts are presented in the expanded view.

Figure 15A:
FIG. 15A illustrates a singing competition television program that is displayed on a television with related supplemental content, in accordance with an embodiment of the invention.

FIG. 15A illustrates a singing competition television program that is displayed on a television with related supplemental content, in accordance with an embodiment of the invention. In the illustrated embodiment, a song that is sung on the show has been detected, and consequently, in a panel 1500 at the lower left of the display, it is indicated that a song has been detected. Information such as the title and artist associated with the song is provided. In a panel 1502 at the lower right of the display, a news headline relating to the television program is displayed.

Figure 15B:
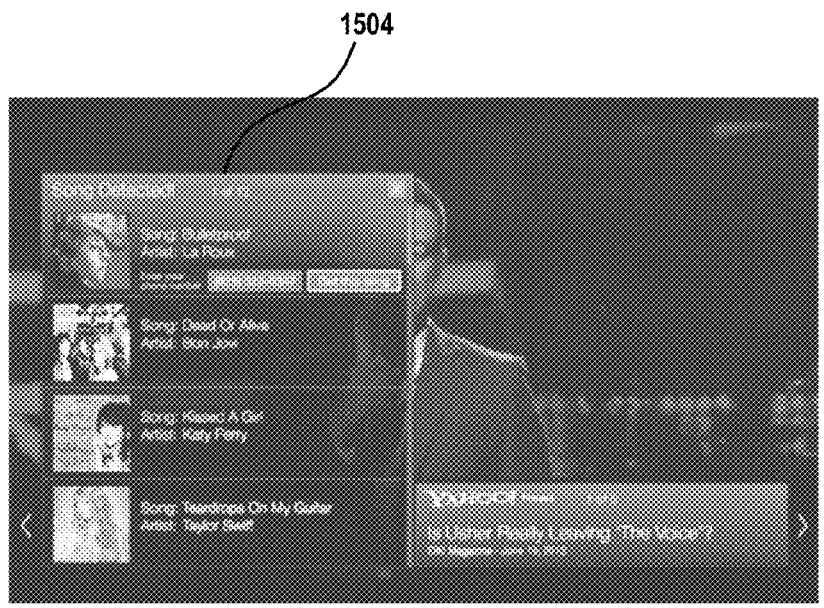
FIG. 15B illustrates an expanded panel providing options for a viewer to obtain a song, in accordance with an embodiment of the invention.
Figure 15C:
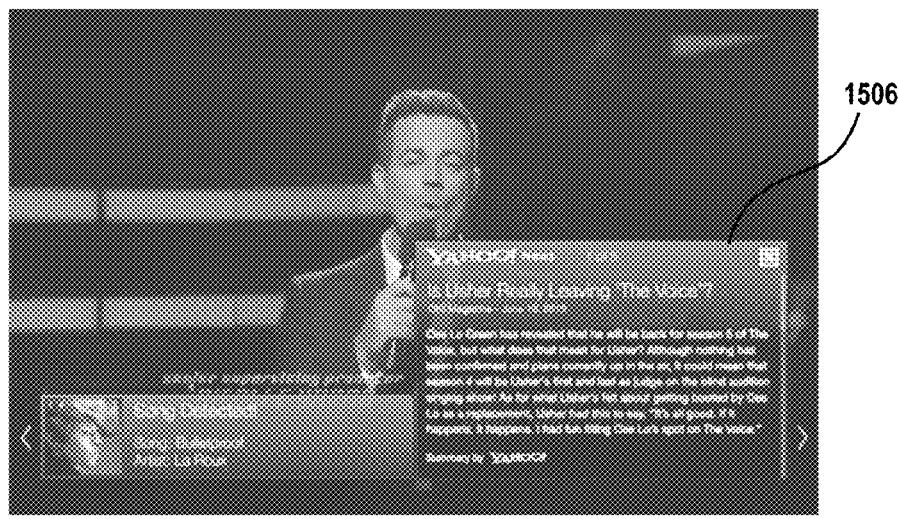
FIG. 15C illustrates an expanded panel revealing additional detailed information relating to a headline, in accordance with an embodiment of the invention.

It will be appreciated that each of the panels 1500 and 1502 may be selected to reveal additional information. For example, selection of panel 1500 results in the view shown at FIG. 15B, wherein in an expanded panel 1504, options for the viewer to obtain the song are provided, and information about additional related songs are displayed. With continued reference to FIG. 15A, selection of panel 1502 results in the view shown at FIG. 15C, wherein an expanded panel 1506 is shown, revealing additional detailed information relating to the headline displayed at panel 1502 (e.g. headline and body of article that is related to the television show).

Though song detection is provided in the context of a singing competition television program, it will be appreciated that song detection can be active during any type of content presentation on the television. Songs can be detected based on analysis of audio samples. Detected songs can be indicated to the viewer during presentation of content including such songs. Options can be provided for the viewer to purchase a detected song or otherwise add it to a music library associated with the viewer or the television device.

Figure 16A:
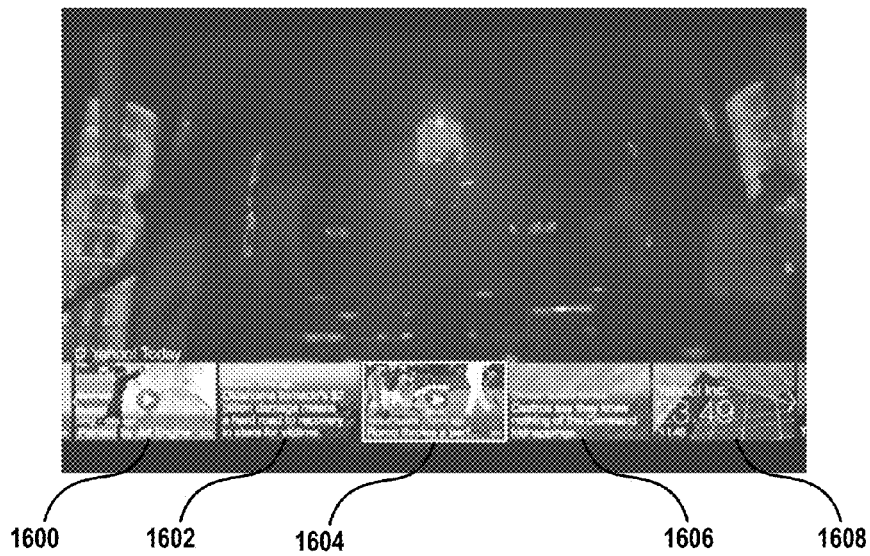
FIG. 16A illustrates supplemental content displayed in conjunction with a television program, in accordance with an embodiment of the invention.

FIG. 16A illustrates supplemental content displayed in conjunction with a television program, in accordance with an embodiment of the invention. In the illustrated embodiment, various selectable icons featuring different types of content are overlayed upon a television display. By way of example, an icon 1600 features a screenshot of an on-demand video which can be accessed by selection of the icon 1600. An icon 1602 illustrates a current news headline, and may be selected to access a more detailed version of the news story. An icon 1604 provides access to another on-demand video, and is currently highlighted amongst the icons, indicating that it may be selected by, for example, pressing a select/enter button on a remote control or otherwise indicating selection through an input mechanism. An icon 1606 illustrates another headline of a news story. And icon 1608 illustrates the stock price of a company. From the interface view illustrated by FIG. 16A, the viewer may hide the interface icons by, for example, pressing a "down" button on a remote control. In the alternative, the viewer may access a full-screen interface view shown at FIG. 16B by, for example, pressing an "up" button on a remote control.

Figure 16B:
FIG. 16B illustrates a full-screen interface providing access to various content that is rendered on a television, in accordance with an embodiment of the invention.

FIG. 16B illustrates a full-screen interface providing access to various content that is rendered on a television, in accordance with an embodiment of the invention. As shown, there are various types of content accessible through the interface, including news stories, videos, weather information, stock information, traffic information, etc. It should be appreciated that such content can be localized based on the location of the television/user.

Figure 17:
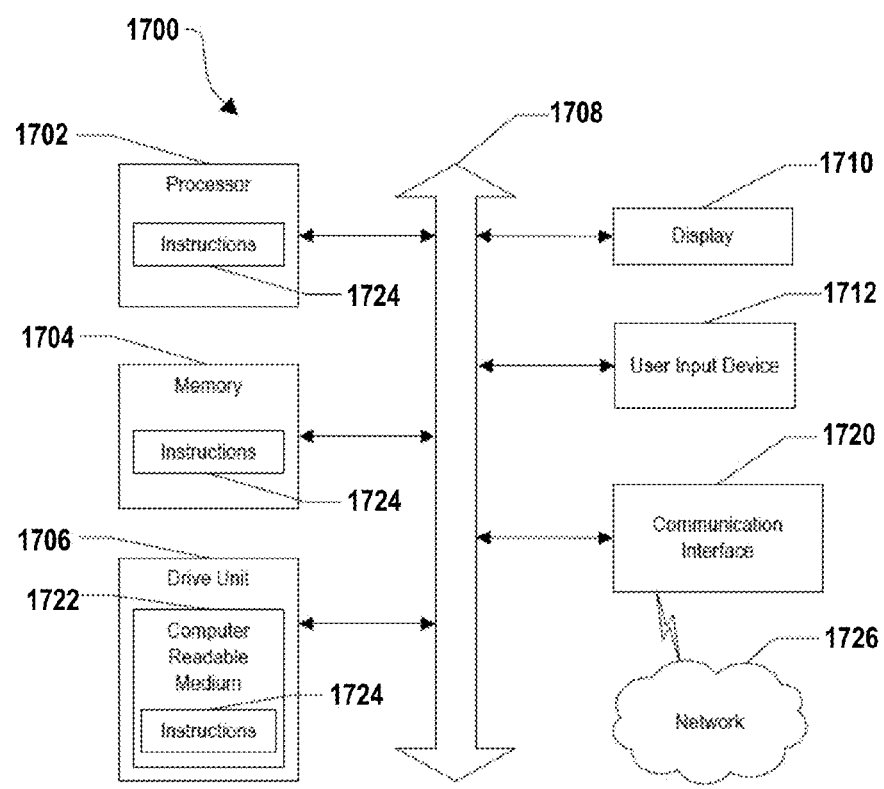
FIG. 17 illustrates an embodiment of a general computer system, in accordance with an embodiment of the invention.

FIG. 17 illustrates an embodiment of a general computer system designated 1700. The computer system 1700 can include a set of instructions that can be executed to cause the computer system 1700 to perform any one or more of the methods or computer based functions disclosed herein. The computer system 1700 may operate as a standalone device or may be connected, e.g., using a network, to other computer systems or peripheral devices.

In a networked deployment, the computer system 1700 may operate in the capacity of a server or as a client user computer in a server-client user network environment, or as a peer computer system in a peer-to-peer (or distributed) network environment. The computer system 1700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1700 can be implemented using electronic devices that provide voice, video or data communication. Further, while a single computer system 1700 is illustrated, the term "system" shall also be taken to include any collection of systems or sub-systems that individually or jointly execute a set, or multiple sets, of instructions to perform one or more computer functions.

As illustrated in FIG. 17, the computer system 1700 may include a processor 1702, e.g., a central processing unit (CPU), a graphics processing unit (GPU), or both. The processor 1702 may be a component in a variety of systems. For example, the processor 1702 may be part of a standard personal computer or a workstation. The processor 1702 may be one or more general processors, digital signal processors, application specific integrated circuits, field programmable gate arrays, servers, networks, digital circuits, analog circuits, combinations thereof, or other now known or later developed devices for analyzing and processing data. The processor 1702 may implement a software program, such as code generated manually (i.e., programmed).

The computer system 1700 may include a memory 1704 that can communicate via a bus 1708. The memory 1704 may be a main memory, a static memory, or a dynamic memory. The memory 1704 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 1704 includes a cache or random access memory for the processor 1702. In alternative embodiments, the memory 1704 is separate from the processor 1702, such as a cache memory of a processor, the system memory, or other memory. The memory 1704 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1704 is operable to store instructions executable by the processor 1702. The functions, acts or tasks illustrated in the figures or described herein may be performed by the programmed processor 1702 executing the instructions stored in the memory 1704. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 1700 may further include a display unit 1710, such as a liquid crystal display (LCD), an organic light emitting diode (OLED), a flat panel display, a solid state display, a cathode ray tube (CRT), a projector, a printer or other now known or later developed display device for outputting determined information. The display 1710 may act as an interface for the user to see the functioning of the processor 1702, or specifically as an interface with the software stored in the memory 1704 or in the drive unit 1716.

Additionally or alternatively, the computer system 1700 may include an input device 1712 configured to allow a user to interact with any of the components of system 1700. The input device 1712 may be a number pad, a keyboard, or a cursor control device, such as a mouse, or a joystick, touch screen display, remote control or any other device operative to interact with the computer system 1700.

The computer system 1700 may also or alternatively include a disk or optical drive unit 1716. The disk drive unit 1716 may include a computer-readable medium 1722 in which one or more sets of instructions 1724, e.g. software, can be embedded. Further, the instructions 1724 may embody one or more of the methods or logic as described herein. The instructions 1724 may reside completely or partially within the memory 1704 and/or within the processor 1702 during execution by the computer system 1700. The memory 1704 and the processor 1702 also may include computer-readable media as discussed above.

In some systems, a computer-readable medium 1722 includes instructions 1724 or receives and executes instructions 1724 responsive to a propagated signal so that a device connected to a network 1726 can communicate voice, video, audio, images or any other data over the network 1726. Further, the instructions 1724 may be transmitted or received over the network 1726 via a communication port or interface 1720, and/or using a bus 1708. The communication port or interface 1720 may be a part of the processor 1702 or may be a separate component. The communication port 1720 may be created in software or may be a physical connection in hardware. The communication port 1720 may be configured to connect with a network 1726, external media, the display 1710, or any other components in system 1700, or combinations thereof. The connection with the network 1726 may be a physical connection, such as a wired Ethernet connection or may be established wirelessly as discussed below. Likewise, the additional connections with other components of the system 1700 may be physical connections or may be established wirelessly. The network 1726 may alternatively be directly connected to the bus 1708.

While the computer-readable medium 1722 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The computer-readable medium 1722 may be non-transitory, and may be tangible.

The computer-readable medium 1722 can include a solid-state memory such as a memory card or other package that houses one or more non-volatile read-only memories. The computer-readable medium 1722 can be a random access memory or other volatile re-writable memory. Additionally or alternatively, the computer-readable medium 1722 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 1700 may be connected to one or more networks 1726. The network 1726 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 1726 may include wide area networks (WAN), such as the Internet, local area networks (LAN), campus area networks, metropolitan area networks, a direct connection such as through a Universal Serial Bus (USB) port, or any other networks that may allow for data communication. The network 1726 may be configured to couple one computing device to another computing device to enable communication of data between the devices. The network 1726 may generally be enabled to employ any form of machine-readable media for communicating information from one device to another. The network 1726 may include communication methods by which information may travel between computing devices. The network 1726 may be divided into sub-networks. The sub-networks may allow access to all of the other components connected thereto or the sub-networks may restrict access between the components. The network 1726 may be regarded as a public or private network connection and may include, for example, a virtual private network or an encryption or other security mechanism employed over the public Internet, or the like.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for recommending television content, comprising:
    receiving, at a server, samples of content rendered on a television device, said content being accessed from a service provider via the television device, the samples of content being received over a network from an application that executes on the television device, the application being unaffiliated with the service provider;
    analyzing the samples to identify watched content items associated with the television device;
    generating a device profile based on the watched content items, the device profile being time-dependent and associated with the television device;
    determining available television channels based on the watched content items, the available television channels being made accessible to the television device by the service provider, wherein determining the available television channels includes analyzing the watched content items to determine a subscription with the service provider that is associated with the television device;
    identifying the available television channels for the television device;
    determining a current date and time;
    identifying a plurality of content items broadcast on the available television channels at approximately the current date and time;
    identifying recommended content items from the plurality of content items based on the device profile of the television device, the recommended content items defined for rendering on the television device;
    wherein identifying recommended content items includes identifying an elapsed amount of each of the plurality of content items that is already in progress, and determining a relevance factor based on the elapsed amount, the relevance factor that is based on the elapsed amount of a given content item being variable based upon a genre of the given content item;
    providing recommendations identifying the recommended content items over the network to the application for rendering as an overlay over the content rendered on the television device;
    wherein the method is executed by at least one processor.

2. The method of claim 1,
    wherein the device profile defines a time-dependent schedule of content preferences;
    wherein determining recommended content items includes determining current content preferences as defined by the time-dependent schedule of content preferences for the current date and time, and identifying ones of the plurality of content items matching the current content preferences.

3. The method of claim 2, wherein the time-dependent schedule of content preferences defines a cyclical timeline of preference values for each of a plurality of content categories.

4. The method of claim 1, wherein the device profile defines an association between a preferred content category and both a day of the week and a time of day.

5. The method of claim 1, wherein determining the relevance factor includes determining whether the elapsed amount exceeds a predefined relevance threshold that is set based upon the genre of the given content item.

6. The method of claim 1, further comprising,
    identifying a user of the television device;
    retrieving a user profile associated to the user of the television device;
    wherein determining recommended content items is based on the user profile.

7. The method of claim 6, wherein the user profile is defined based on internet activity associated with the user.

8. The method of claim 1,
    wherein the samples are defined by audio portions from the content rendered on the television device;
    wherein analyzing the samples includes analyzing the audio portions to identify the watched content items associated with the television device.

9. A system, comprising:
a television, including a receiver capable of receiving a plurality of channels from a service provider, each channel providing a plurality of television content items;
a non-transitory memory connected to the television, including:
a user profile associated with the television, the user profile defining a time-dependent schedule of content preferences, wherein the user profile is defined based on internet activity associated with the user, the internet activity including interaction with internet content presented through an application configured for execution on the television; and
program logic, including
a clock supplying a date and a time;
a user profile generator that receives samples of content rendered on the television, analyzes the samples to identify watched content items associated with the television, and generates the user profile based on the watched content items, wherein the user profile generator analyzes the watched content items to determine a subscription with the service provider that is associated with the television;
a recommendation engine that receives the date and time and the user profile and generates in response a recommendation of at least one television content item, wherein the recommendation engine determines current content preferences as defined by the time-dependent schedule of content preferences for the date and time, and identifies one or more of the plurality of television content items matching the current content preferences;

wherein the recommendation engine identifies an elapsed amount of each of the plurality of content items that is already in progress, and determines a relevance factor based on the elapsed amount, the relevance factor that is based on the elapsed amount for a given content item being variable based upon the time-dependent schedule of content preferences.

10. The system of claim 9, wherein the schedule of content preferences defines a cyclical timeline of preference values for each of a plurality of content categories.

11. The system of claim 9, wherein the user profile defines an association between a preferred content category and both a day of the week and a time of day.

12. The system of claim 9, wherein determining the relevance factor includes determining whether the elapsed amount exceeds a predefined relevance threshold that is set based on the time-dependent schedule of content preferences.

13. The system of claim 9,
wherein the samples are defined by audio portions from the content rendered on the television;
wherein the device profile generator analyzes the audio portions to identify the watched content items associated with the television.

14. The system of claim 9, wherein the user profile identifies the plurality of channels.

15. The system of claim 9, wherein the recommendation engine transmits the recommendation of at least one television content item to an application configured for execution on the television, the application being unaffiliated with a service provider that provides the television channels to the television.

* * * * *